US010134439B2

(12) United States Patent
Matsuoka et al.

(10) Patent No.: US 10,134,439 B2
(45) Date of Patent: Nov. 20, 2018

(54) PLAYBACK DEVICE, PLAYBACK METHOD, AND NON-TRANSITORY RECORDING MEDIUM

(71) Applicant: JVC KENWOOD Corporation, Yokohama-shi, Kanagawa (JP)

(72) Inventors: Kenji Matsuoka, Yokohama (JP); Jiro Uzaki, Yokohama (JP); Mizuki Ohara, Yokohama (JP); Hideaki Onoda, Yokohama (JP)

(73) Assignee: JVC KENWOOD CORPORATION, Kanagawa (JP)

( * ) Notice: Subject to any disclaimer, the term of this patent is extended or adjusted under 35 U.S.C. 154(b) by 0 days.

(21) Appl. No.: 15/176,089

(22) Filed: Jun. 7, 2016

(65) Prior Publication Data
US 2016/0365113 A1 Dec. 15, 2016

(51) Int. Cl.
*G11B 27/00* (2006.01)
*G11B 27/28* (2006.01)
*H04N 5/93* (2006.01)
*H04N 5/783* (2006.01)

(52) U.S. Cl.
CPC ............ *G11B 27/005* (2013.01); *G11B 27/28* (2013.01); *H04N 5/93* (2013.01); *H04N 5/783* (2013.01)

(58) Field of Classification Search
CPC ........ G11B 27/005; G11B 27/28; H04N 5/93; H04N 5/783
USPC ......................................... 386/248
See application file for complete search history.

(56) References Cited

U.S. PATENT DOCUMENTS

| 2005/0232588 A1* | 10/2005 | Hosoda | H04N 5/783 386/248 |
| 2007/0071406 A1* | 3/2007 | Koga | G06F 17/30787 386/241 |
| 2008/0133638 A1* | 6/2008 | Fischer | G06Q 50/01 709/201 |
| 2010/0124400 A1* | 5/2010 | Kim | H04N 5/783 386/241 |
| 2011/0161168 A1* | 6/2011 | Dubnicki | G06F 17/30707 705/14.49 |

FOREIGN PATENT DOCUMENTS

JP H10174056 6/1998

* cited by examiner

*Primary Examiner* — Loi H Tran
(74) *Attorney, Agent, or Firm* — Procopio, Cory, Hargreaves & Savitch LLP

(57) ABSTRACT

A playback device includes a playback controller that sets a scene with a higher level of importance at a lower playback speed and sets a scene with a lower level of importance at a higher playback speed based on a level of importance of each scene of video data, and an image data processor that converts the video data into a playback speed set by the playback controller for each scene, wherein the playback controller plays back the video data within a preset playback time. Further, the playback method plays back video data within a preset playback time by playing back a scene with a higher level of importance at a lower playback speed and playing back a scene with a lower level of importance at a higher playback speed based on a level of importance of each scene.

6 Claims, 21 Drawing Sheets

| SCENE NO. | 1 | 2 | 3 | 4 | 5 | 6 | 7 | 8 | 9 | 10 | 11 | 12 |
|---|---|---|---|---|---|---|---|---|---|---|---|---|
| SCENE IMAGING TIME | 6 | 18 | 9 | 12 | 3 | 9 | 12 | 9 | 15 | 3 | 12 | 12 |
| TAG | * | | * | | * | | | * | | | | |
| LEVEL OF IMPORTANCE | 1 | | 3 | | 2 | | | 4 | | | | |
| PLAYBACK SPEED | 1 | 18.6 | 1.1 | 18.6 | 3 | 18.6 | 18.6 | 1.1 | 18.6 | 18.6 | 18.6 | 18.6 |
| PLAYBACK TIME | 6 | 0.9 | 8 | 0.6 | 1 | 0.4 | 0.6 | 8 | 0.8 | 0.2 | 0.6 | 0.6 |

Fig. 4

| SCENE NO. | 1 | 2 | 3 | 4 | 5 | 6 | 7 | 8 | 9 | 10 | 11 | 12 |
|---|---|---|---|---|---|---|---|---|---|---|---|---|
| SCENE IMAGING TIME | 6 | 18 | 9 | 12 | 3 | 9 | 12 | 9 | 15 | 3 | 12 | 12 |
| TAG | * | * |  | * | * | * |  |  |  |  |  |  |
| LEVEL OF IMPORTANCE | 2 | 1 |  | 4 |  | 3 |  |  |  |  |  |  |
| PLAYBACK SPEED | 2.7 | 1 | 15 | 2.7 | 15 | 2.7 | 15 | 15 | 15 | 15 | 15 | 15 |
| PLAYBACK TIME | 2.2 | 18 | 0.6 | 4.4 | 0.2 | 3.3 | 0.8 | 0.6 | 1 | 0.2 | 0.8 | 0.8 |

Fig. 6

| SCENE NO. | 1 | 2 | 3 | 4 | 5 | 6 | 7 | 8 | 9 | 10 | 11 | 12 |
|---|---|---|---|---|---|---|---|---|---|---|---|---|
| SCENE IMAGING TIME | 6 | 18 | 9 | 12 | 3 | 9 | 12 | 9 | 15 | 3 | 12 | 12 |
| TAG | * | | | | * | | | | | * | | |
| LEVEL OF IMPORTANCE | 2 | | | | 1 | | | | | 3 | | |
| PLAYBACK SPEED | 1 | 6 | 6 | 6 | 1 | 6 | 6 | 6 | 6 | 1 | 6 | 6 |
| PLAYBACK TIME | 6 | 3 | 1.5 | 2 | 3 | 1.5 | 2 | 1.5 | 2.5 | 3 | 2 | 2 |

Fig. 8

| SCENE NO. | 1 | 2 | 3 | 4 | 5 | 6 | 7 | 8 | 9 | 10 | 11 | 12 |
|---|---|---|---|---|---|---|---|---|---|---|---|---|
| SCENE IMAGING TIME | 6 | 18 | 9 | 12 | 3 | 9 | 12 | 9 | 15 | 3 | 12 | 12 |
| TAG | * | | * | | * | | | | | * | | |
| LEVEL OF IMPORTANCE | 2 | | 4 | | 1 | | | | | 3 | | |
| PLAYBACK SPEED | 1 | 11 | 1 | 11 | 1 | 11 | 11 | 11 | 11 | 1 | 11 | 11 |
| PLAYBACK TIME | 6 | 1.6 | 9 | 1.1 | 3 | 0.8 | 1.1 | 0.8 | 1.4 | 3 | 1.1 | 1.1 |

Fig. 10

| SCENE NO. | 1 | 2 | 3 | 4 | 5 | 6 | 7 | 8 | 9 | 10 | 11 | 12 |
|---|---|---|---|---|---|---|---|---|---|---|---|---|
| SCENE IMAGING TIME | 6 | 18 | 9 | 12 | 3 | 9 | 12 | 9 | 15 | 3 | 12 | 12 |
| TAG | * | * | * | * | * | * | * |  | * | * |  | * |
| LEVEL OF IMPORTANCE | 2 | 8 | 4 | 10 | 1 | 9 | 7 |  | 5 | 3 |  | 6 |
| PLAYBACK SPEED | 1 | 6 | 6 | 6 | 1 | 6 | 6 | 6 | 6 | 1 | 6 | 6 |
| PLAYBACK TIME | 6 | 3 | 1.5 | 2 | 3 | 1.5 | 2 | 1.5 | 2.5 | 3 | 2 | 2 |

Fig. 12

| SCENE NO. | 1 | 2 | 3 | 4 | 5 | 6 | 7 | 8 | 9 | 10 | 11 | 12 |
|---|---|---|---|---|---|---|---|---|---|---|---|---|
| SCENE IMAGING TIME | 6 | 18 | 9 | 12 | 3 | 9 | 12 | 9 | 15 | 3 | 12 | 12 |
| TAG | * | * | * | * | * | * | * | * | * | * | * | * |
| LEVEL OF IMPORTANCE | 2 | 8 | 4 | 10 | 1 | 9 | 7 | 11 | 5 | 3 | 12 | 6 |
| PLAYBACK SPEED | 1 | 6 | 6 | 6 | 1 | 6 | 6 | 6 | 6 | 1 | 6 | 6 |
| PLAYBACK TIME | 6 | 3 | 1.5 | 2 | 3 | 1.5 | 2 | 1.5 | 2.5 | 3 | 2 | 2 |

Fig. 14

| SCENE NO. | 1 | 2 | 3 | 4 | 5 | 6 | 7 | 8 | 9 | 10 | 11 | 12 |
|---|---|---|---|---|---|---|---|---|---|---|---|---|
| SCENE IMAGING TIME | 6 | 18 | 9 | 12 | 3 | 9 | 12 | 9 | 15 | 3 | 12 | 12 |
| TAG | | | | | | | | | | | | |
| LEVEL OF IMPORTANCE | | | | | | | | | | | | |
| PLAYBACK SPEED | 4 | 4 | 4 | 4 | 4 | 4 | 4 | 4 | 4 | 4 | 4 | 4 |
| PLAYBACK TIME | 1.5 | 4.5 | 2.25 | 3 | 0.75 | 2.25 | 3 | 2.25 | 3.75 | 0.8 | 3 | 3 |

Fig. 16

PLAYBACK DEVICE, PLAYBACK METHOD, AND NON-TRANSITORY RECORDING MEDIUM

CROSS REFERENCE TO RELATED APPLICATION

This application is based upon and claims the benefit of priority from Japanese patent application No. 2015-118860, filed on Jun. 12, 2015, the disclosure of which is incorporated herein in its entirety by reference.

BACKGROUND

The present invention relates to a playback device, a playback method and a playback program and, particularly, relates to a playback device, a playback method and a playback program for playing back a video.

In a method of playing back video data taken with a digital camera or a digital video recorder, playback time is reduced by playing back the video data at a fast-forward speed which is higher than a normal playback speed.

For example, a playback device that detects a scene where the motion of an object or a human appears in video content and plays back the scene at normal playback speed, and fast-forwards the other scenes is disclosed in Japanese Unexamined Patent Publication No. H10-174056.

SUMMARY

However, the playback device disclosed in Japanese Unexamined Patent Publication No. H10-174056 has a problem that a scene which is played back at normal playback speed and a scene which a person who has taken the video thinks important and wants to play back at normal playback speed do not match. Specifically, when the motion of an object or a human appears in video content of a certain scene, the scene is played back at normal playback speed in the playback device disclosed in Japanese Unexamined Patent Publication No. H10-174056 even if a person who has taken the video does not think the scene important. Thus, the playback time is not sufficiently reduced, and it is not possible to view the entire recorded data which the person wants to play back within a limited length of time.

A playback device according to an embodiment includes a playback controller that sets a scene with a higher level of importance at a lower playback speed and sets a scene with a lower level of importance at a higher playback speed based on a level of importance of each scene of video data, and an image data processor that converts the video data into a playback speed set by the playback controller for each scene, wherein the playback controller plays back the video data within a preset playback time.

A playback method according to an embodiment plays back video data within a preset playback time by playing back a scene with a higher level of importance at a lower playback speed and playing back a scene with a lower level of importance at a higher playback speed based on a level of importance of each scene of the video data.

A playback program according to an embodiment causes a computer to execute a reading step of reading video data and a level of importance of each scene of the video data from a recording medium, and a display step of playing back the video data on a display device within a preset playback time by playing back a scene with a higher level of importance at a lower playback speed and playing back a scene with a lower level of importance at a higher playback speed based on the level of importance of each scene.

BRIEF DESCRIPTION OF THE DRAWINGS

The above and other aspects, advantages and features will be more apparent from the following description of certain embodiments taken in conjunction with the accompanying drawings, in which:

FIG. 4 is a view showing the relationship of a scene number (No.) of video data, a recording time, a mark (*) indicating a scene where a tag is placed, the order of importance of a marked scene, a playback speed and a playback time;

FIG. 6 is a view showing the relationship of a scene number (No.) of video data, a recording time, a mark (*) indicating a scene where a tag is placed, the order of importance of a marked scene, a playback speed and a playback time;

FIG. 8 is a view showing the relationship of a scene number (No.) of video data, a recording time, a mark (*) indicating a scene where a tag is placed, the order of importance of a marked scene, a playback speed and a playback time;

FIG. 10 is a view showing the relationship of a scene number (No.) of video data, a recording time, a mark (*) indicating a scene where a tag is placed, the order of importance of a marked scene, a playback speed and a playback time;

FIG. 12 is a view showing the relationship of a scene number (No.) of video data, a recording time, a mark (*) indicating a scene where a tag is placed, the order of importance of a marked scene, a playback speed and a playback time;

FIG. 14 is a view showing the relationship of a scene number (No.) of video data, a recording time, a mark (*) indicating a scene where a tag is placed, the order of importance of a marked scene, a playback speed and a playback time;

FIG. 16 is a view showing the relationship of a scene number (No.) of video data, a recording time, a mark (*) indicating a scene where a tag is placed, the order of importance of a marked scene, a playback speed and a playback time;

DETAILED DESCRIPTION (Embodiment)

Figure 1:
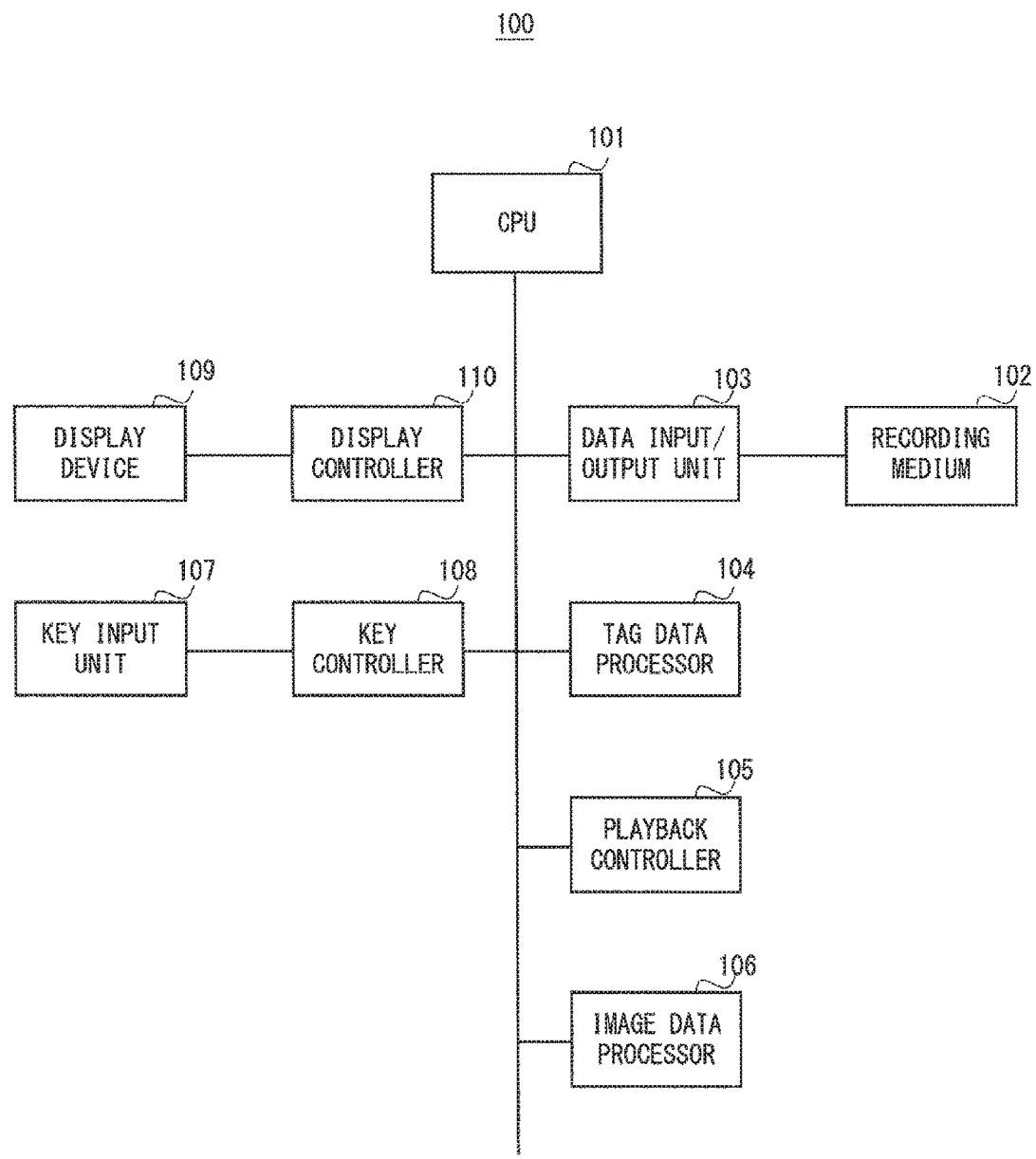
FIG. 1 is a block diagram showing the configuration of a playback device according to an embodiment.

An embodiment of the present invention is described hereinafter with reference to the drawings. FIG. 1 is a block diagram showing the configuration of a playback device according to this embodiment. In FIG. 1, a playback device 100 includes a CPU 101, a recording medium 102, a data input/output unit 103, a tag data processor 104, a playback controller 105, an image data processor 106, a key input unit 107, a key controller 108, a display device 109, and a display controller 110.

The CPU 101 is a central processing unit, and it connects with the data input/output unit 103, the tag data processor 104, the playback controller 105, the image data processor 106, the key controller 108 and the display controller 110 through a data bus, and performs information processing by executing program instructions.

The recording medium 102 is a medium for recording video data. For example, a nonvolatile memory such as a flash memory is suitable for use as the recording medium 102. Further, the recording medium 102 may be removable from the playback device 100.

The data input/output unit 103 stores data into the recording medium 102 or reads data from the recording medium 102. The data input/output unit 103 is suitably configured as an interface circuit with the recording medium 102, for example.

The tag data processor 104 acquires tag data and information about the level of importance attached to video data and outputs them to the playback controller 105.

The playback controller 105 sets the playback speed of video data based on tag data and information about the level of importance attached to the video data. For example, the playback controller 105 sets the playback speed of video data for each scene based on tag data and information about the level of importance attached to the video data.

For example, the playback controller 105 sets a scene with a higher level of importance at a lower playback speed and sets a scene with a lower level of importance at a higher playback speed based on the level of importance of each scene of video data. Further, for example, the playback controller 105 sets a scene with a higher level of importance at 1× playback speed and sets a scene with a lower level of importance at a playback speed which is higher than 1× and at which the entire video data can be played back within a desired playback time.

Further, for video data where at least a video and a tag are combined for each scene, the playback controller 105 sets a scene to which a tag is assigned as a scene with a higher level of importance at a lower playback speed and sets a scene to which a tag is not assigned as a scene with a lower level of importance at a higher playback speed, for example.

Further, for video data where at least a video, a tag and the level of importance are combined for each scene, the playback controller 105 sets a scene with a higher level of importance to which a tag is assigned at a lower playback speed, sets a scene with a lower level of importance to which a tag is assigned at a higher playback speed, and sets a scene to which a tag is not assigned at a still higher playback speed than the scene with a lower level of importance to which a tag is assigned.

The image data processor 106 performs image processing on video data stored in the recording medium 102. To be specific, the image data processor 106 converts the video data into a frame rate (playback speed) specified by the CPU 101 or the playback controller 105.

The key input unit 107 receives an input that is necessary for operating the playback device 100. For example, a switch or the like that connects electrical circuits by an operation such as pressing a button is suitable for use as the key input unit 107.

The key controller 108 performs various kinds of processing on a signal generated by the operation of the key input unit 107 and outputs the signal. For example, the key controller 108 performs processing such as the amplification of electrical signals and the removal of noise by chattering.

The display device 109 is a device that displays video data processed by the image data processor 106 through the display controller 110. For example, a liquid crystal display, an organic EL display, a plasma display, a video projector, a cathode ray tube or the like is suitable for use as the display device 109.

The display controller 110 converts and amplifies electrical signals in order to play back the video data converted by the image data processor 106 by using the playback controller 105 and display the video by using the display device 109. For example, a display driver is suitable for use as the display controller 110.

Figure 2:
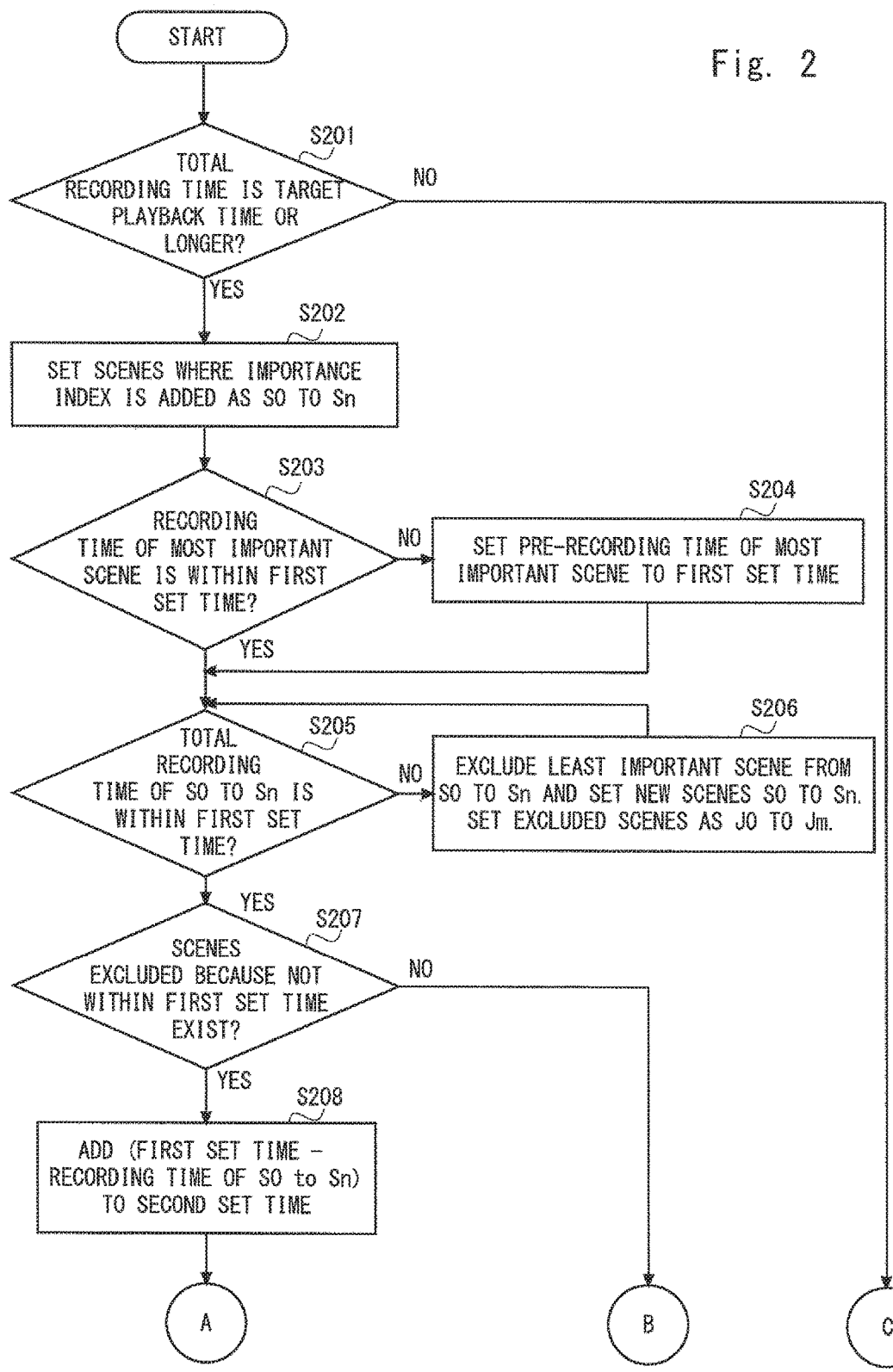
FIG. 2 is a flowchart showing an example of the operation of the playback device according to the embodiment.
Figure 3:
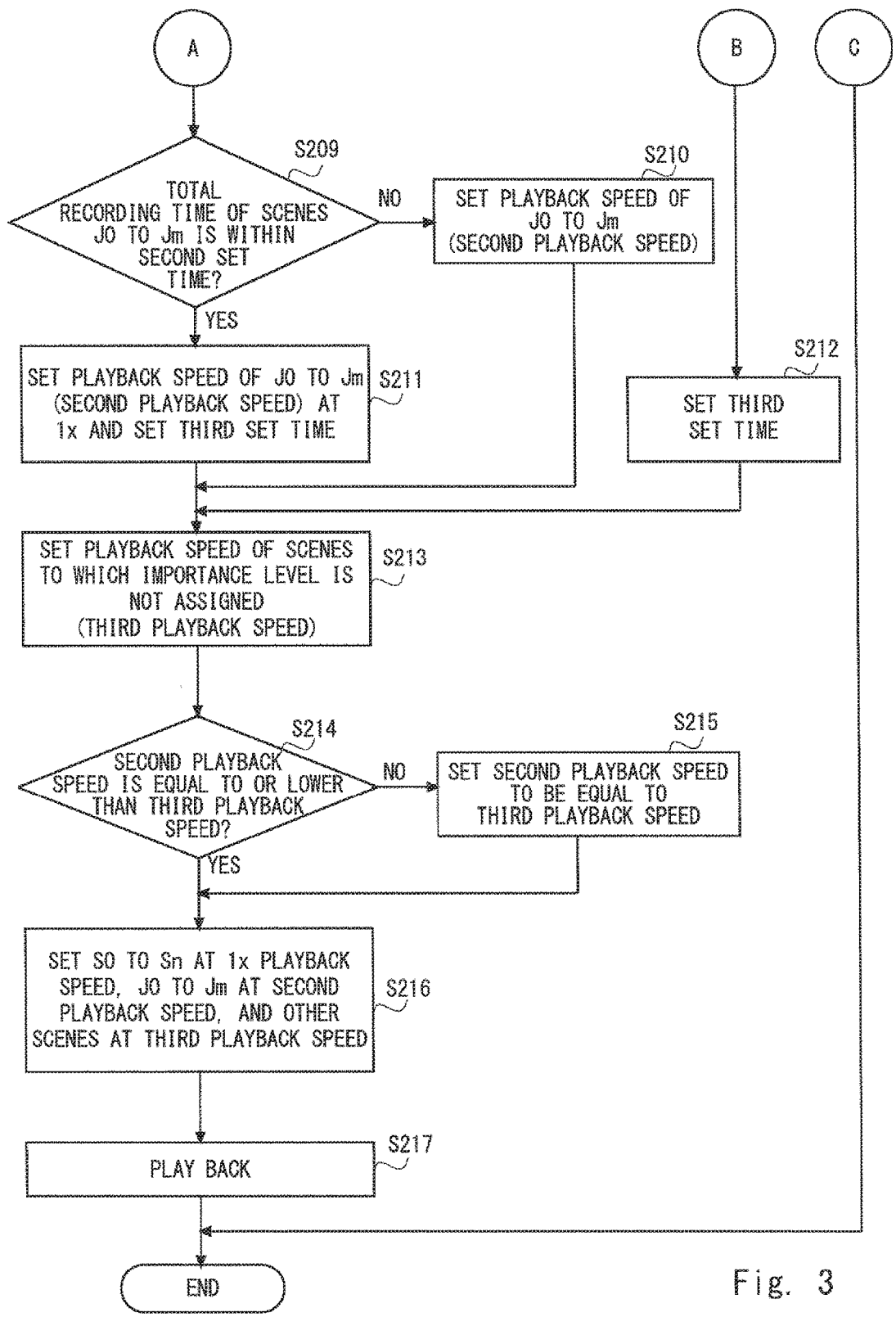
FIG. 3 is a flowchart showing an example of the operation of the playback device according to the embodiment.

The operation of the playback device 100 is described hereinafter. FIGS. 2 and 3 are flowcharts showing an example of the operation of the playback device according to this embodiment.

First, a target playback time of video data is set in advance by inputting through the operation of the key input unit 107 or selecting from choices. The target playback time is a time which a user can set freely, and even when video data is longer than the target playback time, it can be played back within a time set as the target playback time by changing the playback speed of the video data. The target playback time is stored in a storage area (not shown) in the CPU.

Next, in Step S201, it is determined whether it is necessary to set the playback speed of video data to be played back. Specifically, in Step S201, the playback controller 105 determines whether the total recording time of video data to be played back is equal to or longer than the target playback time. When the total recording time of video data to be played back is equal to or longer than the target playback time, it is necessary to change the playback speed, and the process proceeds to Step S202. On the other hand, when the total recording time of video data to be played back is shorter than the target playback time, it is not necessary to change the playback speed, and the process ends.

Then, in Step S202, the playback controller 105 sets scenes to which information about the level of importance is assigned as important scenes S0 to Sn (n is an integer), and the process proceeds to Step S203.

In Step S203, the playback controller 105 determines whether the recording time of the most important scene among the scenes S0 to Sn is equal to or less than a first set time. The first set time is a time for playing back an important scene, and it is a playback time of a scene that is played back at 1× speed, for example. When the recording time of the most important scene among the scenes S0 to Sn is equal to or shorter than the first set time, the process proceeds to Step S205. On the other hand, when the recording time of the most important scene among the scenes S0 to Sn is longer than the first set time, the process proceeds to Step S205.

In Step S204, the playback controller 105 changes the first set time from a preset value to the recording time of the most important scene so that at least one most important scene can be played back in the first set time (at 1× playback speed), and the process proceeds to Step S205.

In Steps S205 and S206, a scene that can be played back at 1× speed within the first set time is selected from the scenes to which tags are assigned.

To be specific, in Step S205, the playback controller 105 determines whether the total recording time of the scenes S0 to Sn is within the first set time or not. When the total recording time of the scenes S0 to Sn is equal to or shorter than the first set time, the process proceeds to Step S207, and when the total recording time of the scenes S0 to Sn is longer than the first set time, the process proceeds to Step S206.

Then, in Step S206, the playback controller 105 excludes the least important scene among the scenes S0 to Sn, and sets the other scenes as new scenes S0 to Sn and sets the excluded scene as J0 to Jm (m is an integer), and then the process returns to Step S205. In other words, by the loop processing of Steps S205 and S206, scenes with low levels of importance are excluded so as to select the scenes S0 to Sn that are within the first set time. Note that the values n and m vary depending on the processing of excluding target scenes. When the processing of excluding target scenes is done, n decreases and m increases.

In Step S207, the playback controller 105 determines whether there are the scenes J0 to Jm that have been excluded because they are not within the first set time. When the scenes J0 to Jm that have been excluded because they are not within the first set time exist, the process proceeds to Step S208, and when the scenes J0 to Jm that have been excluded because they are not within the first set time do not exist, the process proceeds to Step S212.

In Step S208, the playback controller 105 adds a value obtained by subtracting the recording time of the scenes S0 to Sn from the first set time, which is a redundant time being a difference between the recording time of the scenes S0 to Sn and the first set time, to a second set time, and the process proceeds to Step S209.

In Step S209, the playback controller 105 determines whether the total recording time of the scenes J0 to Jm is within the second set time or not. When the total recording time of the scenes J0 to Jm is equal to or shorter than the second set time, the process proceeds to Step S211, and when the total recording time of the scenes J0 to Jm is longer than the second set time, the process proceeds to Step S210.

In Step S210, the playback controller 105 sets the playback speed of the scenes J0 to Jm (second playback speed) at which the scenes J0 to Jm can be played back within the second set time, and the process proceeds to Step S213. To be specific, in Step S210, the playback speed of J0 to Jm (second playback speed) is obtained by dividing the total recording time of the scenes J0 to Jm by the second set time.

In Step S211, the playback controller 105 sets the playback speed of the scenes J0 to Jm (second playback speed) at 1× playback speed, and adds a value obtained by subtracting the recording time of the scenes J0 to Jm from the second set time to a third set time, and the process proceeds to Step S213.

In Step S212, the playback controller 105 sets the third set time, and the process proceeds to Step S213. To be specific, in Step S212, a value obtained by adding the second set time to the first set time and then subtracting the total recording time of the scenes S0 to Sn is added to the third set time.

In Step S213, the playback controller 105 sets the playback speed of scenes to which the level of importance is not assigned (third playback speed), and the process proceeds to Step S214. To be specific, in Step S213, the playback speed of scenes to which the level of importance is not assigned (third playback speed) is obtained by dividing the total recording time of the scenes to which the level of importance is not assigned by the third set time. Note that, when there is no scene to which the level of importance is not assigned and there is no third playback speed, the third playback speed is set to 0.

In Step S214, it is checked whether the playback speed of less important scenes (second playback speed) is lower than the playback speed of less important scenes with no tags (third playback speed). In Step S214, the playback controller 105 determines whether the second playback speed is equal to or lower than the third playback speed. When the second playback speed is equal to or lower than the third playback speed, the process proceeds to Step S216, and when the second playback speed is higher than the third playback speed, the process proceeds to Step S215.

In Step S215, the playback controller 105 sets the second playback speed to be equal to the third playback speed, and the process proceeds to Step S216. To be specific, in Step S215, the second playback speed and the third playback speed are obtained by dividing the total playback time of the scenes excluding S0 to Sn by the sum of the second set time and the third set time.

In Step S216, the playback controller 105 sets the scenes S0 to Sn at 1× playback speed (first playback speed), the scenes J0 to Jm at the second playback speed, and the other scenes at the third playback speed, and then the process proceeds to Step S217.

In Step S217, the image data processor 106 converts each scene of the video data into data corresponding to the set playback speed and displays them on the display device 109 through the display controller 110.

By the above operation, the playback device 100 can determine the playback speed in consideration of the level of importance for each scene.

An example of determining the playback speed by using the playback device 100 is described hereinafter. As one example, the case of playing back a recorded video of 120 minutes in 30 minutes by changing the playback speed in accordance with the level of importance is described. To be specific, the case where the recorded video of 120 minutes is a video of a baseball game of 120 minutes long is described as an example.

In the case where the recorded video of 120 minutes is set to be played back in total 30 minutes: 15 minutes for the important scenes with tags, 10 minutes for the less important scenes with tags, and 5 minutes for the scenes with no tags, the following allocation can be made.

It is assumed that a tag with a range of 30 seconds is placed 60 times in total on scenes of a base hit, a good play, a close play, getting out of a jam with a strikeout or a double play, other key scenes and the like. In this case, because a tag is placed 60 times for 30 seconds each, if all of the scenes where the tags are placed are played back at 1× speed, it is 1800 seconds=30 minutes in total.

If 30 tags with a high level of importance are played back at 1× speed, the playback time is 30 tags×30 seconds=900 seconds=15 minutes. If the remaining 30 tags with a low level of importance are played back at 1× speed, the playback time is 30 tags×30 seconds=900 seconds=15 minutes;

however, in order to reduce the playback time from 15 minutes to be equal to or shorter than 10 minutes, those tags are played back at 15/10=1.5× speed.

Further, in order to play back the recorded video of 90 minutes with no tags within the remaining 5 minutes, it is played back at 18× speed. As a result, the playback time is 30 minutes in total.

A normal video is composed of 60 frames of images per second, and playing back at 18× speed means to extract 3.33 images from 60 images per second and play them back. In other words, it is to extract 10 images from 180 images per 3 seconds and play them back. The 18× playback speed is enough to grasp how the game goes by seeing innings pitched, a change of batter, base running, the end of inning and the like, while it is not possible to see the type of pitch thrown by a pitcher, the moment a batter hits the ball or the like.

Further, in the case where the number of tags is about half the above, the time of scenes where tags are placed is about 15 minutes, and it is possible to play back all of the scenes with tags at 1× playback speed. In this case, the scenes with no tags of 115 minutes need to be played back in the remaining 15 minutes, and the playback speed of the scenes with no tags is 7.66×.

On the contrary, in the case where the number of tags is 90, 30 tags with a high level of importance are played back at 1× speed, 60 tags with a low level of importance are played back at 3× speed, and scenes with no tags are played back at 15× speed.

In the case where a tag is not placed at all, the playback speed is 4×, which is a result of dividing the recording time 120 minutes by the target playback time 30 minutes.

As described above, in a normal case, less important scenes with tags are played back at 1× to 4× speed (note that it can be 7× at maximum if the proportion of scenes with tags to the entire recording time increases), and scenes with no tags are played back at 4× to 20× speed (note that the maximum value is 19× according to calculations).

It should be noted that specific numerical values in the above description are those in the case where the recorded video of 120 minutes is played back in 30 minutes, and the playback speed is higher than the above values when the recorded video of 120 minutes is played back in a shorter time, and the playback speed is lower than the above values when it is played back in a longer time.

As described above, the playback controller 105 determines the playback speed of each scene of video data, and the video data whose playback speed is converted by the image data processor 106 is played back by the playback controller 105.

Examples of calculation of the playback speed are described for several cases where the tags and the levels of importance are assigned in different ways.

Generally, scenes where tags are placed are present in a discrete manner in a recorded video, and a part between those scenes is a scene with no tag. However, in order to describe special cases and facilitate the description, it is assumed in the following description that there are 12 scenes in a video of 120 minutes, and a scene with a tag has a length of several minutes. Further, although the digits after the second decimal place are omitted to simplify the description, the digits after the second decimal place may be taken into consideration in practice.

FIGS. 4, 6, 8, 10, 12, 14 and 16 are views showing the relationship of a scene number (No.), a recording time, a mark (\*) indicating a scene where a tag is placed, the order of importance of a marked scene, a playback speed and a playback time. FIGS. 5, 7, 9, 11, 13, 15 and 17 are views showing the relationship between a recording time and a playback time. FIGS. 4 to 17 are described with reference to the flowcharts of FIGS. 2 and 3.

<Case 1>

In Case 1, a standard example is described with reference to FIGS. 4 and 5.

At the beginning, as initially allocated values, the total playback time of scenes with a high level of importance (first set time) is set to 15 minutes, the total playback time of scenes with a low level of importance (second set time) is set to 10 minutes, and the total playback time of scenes with no tags (third set time) is set to 5 minutes.

First, because the total recording time (120 minutes) is longer than the target playback time (30 minutes), and it cannot be within the target playback time if the entire video is played back at 1× speed, the determination in Step S201 of FIG. 3 results in Yes, and it is thus necessary to set the playback speed to fall within the target playback time.

Next, the recording time of the most importance scene 1 is 6 minutes, which is shorter than the first set time (15 minutes), and therefore the determination in Step S203 of FIG. 3 results in Yes, and the first set time is not changed.

Then, the total recording time of the scenes 1, 5, 3 and 8 where tags are placed is 27 minutes, which is longer than the first set time (15 minutes), and therefore the determination in Step S205 of FIG. 3 results in No. Because the total recording time of the scenes where tags are placed is not within the first set time, the scenes where tags are placed are excluded in ascending order of the level of importance by the loop processing of Steps S205 and S206. Then, because the total recording time of the scenes 1 and 5 (9 minutes) is shorter than the first set time (15 minutes), the scenes 1 and 5 are set as the scenes S0 to S1 with a high level of importance, and the excluded scenes 3 and 8 are set as the scenes J0 to J1 with a low level of importance.

After that, because the scenes where tags are placed are not within the first set time, the determination in Step S207 of FIG. 3 results in Yes, and the total playback time of the scenes with a low level of importance (second set time) is set. To be specific, the second set time is set to 16 minutes by adding a value (6 minutes) obtained by subtracting the recording time of S0 to S1 (9 minutes) from the first set time (15 minutes) to the second set time (10 minutes).

Because the recording time of J0 to J1 (18 minutes) is longer than the second set time (16minutes), and the determination in Step S209 of FIG. 3 results in No, the playback speed for playing back the scenes J0 to J1 within the second set time is determined. To be specific, the playback speed is set to 18/16=1.125× by dividing the playback time of J0 to J1 (18 minutes) by the second set time (16 minutes).

Further, in order to reduce the total recording time of the scenes with no tags (93 minutes) to be within the total playback time of the scenes with no tags (third set time) (5 minutes), the playback speed is set to 93/5=18.6×.

After that, it is checked whether the playback speed of less important scenes (second playback speed) is lower than the playback speed of less important scenes with no tags (third playback speed). To be specific, because the second playback speed (1.125×) is lower than the third playback speed (18.6×), and the determination in Step S214 of FIG. 3 results in Yes, the second playback speed and the third playback speed are not changed. Then, the first playback speed is set to 1×, the second playback speed is set to 1.125×, and the third playback speed is set to 18.6×.

Figure 5:
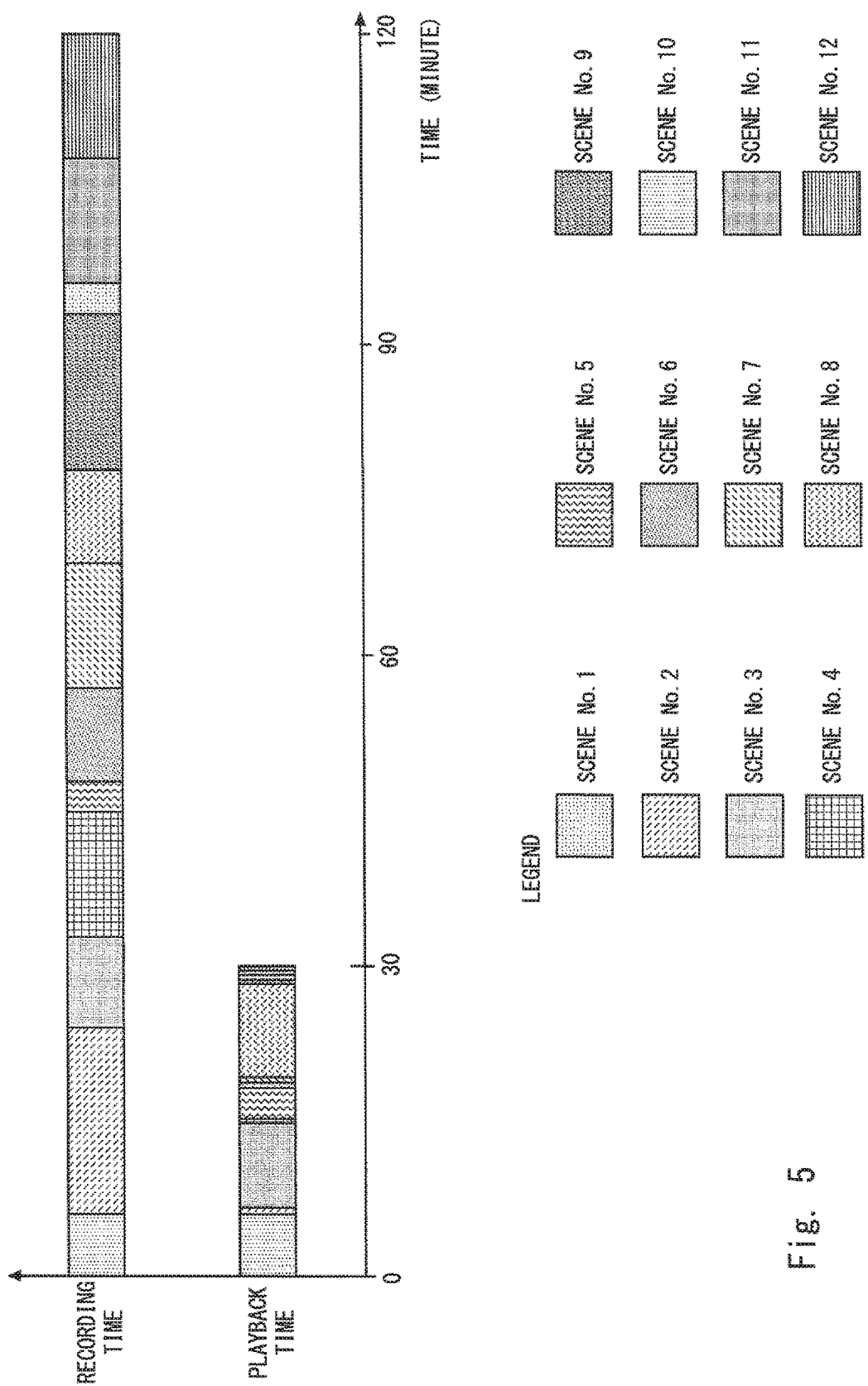
FIG. 5 is a view showing the relationship between a recording time and a playback time.

FIG. 5 shows the recording time and the playback time in the case where the first playback speed, the second playback speed and the third playback speed are set as above.

<Case 2>

In Case 2, an example in which the recording time of the most important scene is longer than the first set time and the determination in Step S203 of FIG. 3 results in No is described with reference to FIGS. 6 and 7.

At the beginning, as initially allocated values, the total playback time of scenes with a high level of importance (first set time) is set to 15 minutes, the total playback time of scenes with a low level of importance (second set time) is set to 10 minutes, and the total playback time of scenes with no tags (third set time) is set to 5 minutes.

First, because the total recording time (120 minutes) is longer than the target playback time (30 minutes), and it cannot be within the target playback time if the entire video is played back at 1× speed, the determination in Step S201 of FIG. 3 results in Yes, and it is thus necessary to set the playback speed to fall within the target playback time.

Next, the recording time of the most importance scene 2 is 18 minutes, which is longer than the first set time (15 minutes), and therefore the determination in Step S203 of FIG. 3 results in No, and the first set time is set to 18 minutes.

Then, the total recording time of the scenes 2, 1, 6 and 4 where tags are placed is 45 minutes, which is longer than the first set time (18 minutes), and therefore the determination in Step S205 of FIG. 3 results in No. Because the total recording time of the scenes where tags are placed is not within the first set time, the scenes where tags are placed are excluded in ascending order of the level of importance by the loop processing of Steps S205 and S206. Then, because the total recording time of the scene 2 (18 minutes) is equal to or shorter than the first set time (18 minutes), the scene 2 is set as S0, and the scenes 1, 6 and 4 are set as J0 to J2.

After that, a result of subtracting the recording time of S0 (18 minutes) from the first set time (18 minutes) is 0, and the determination in Step S207 of FIG. 3 results in NO, and the second set time is not changed.

Because the recording time of J0 to J2 (27 minutes) is longer than the second set time (10 minutes), and the determination in Step S209 of FIG. 3 results in No, the playback speed is set to 27/10=2.7× in order to reduce the playback time of J0 to J2 to be within 10 minutes.

Further, in order to reduce the total recording time of the scenes with no tags (75 minutes) to be within the total playback time of the scenes with no tags (third set time) (5 minutes), the playback speed is set to 75/5=15×.

After that, because the second playback speed (2.7×) is lower than the third playback speed (15×), and the determination in Step S214 of FIG. 3 results in Yes, the second playback speed and the third playback speed are not changed. Then, the first playback speed is set to 1×, the second playback speed is set to 2.7×, and the third playback speed is set to 15×.

Figure 7:
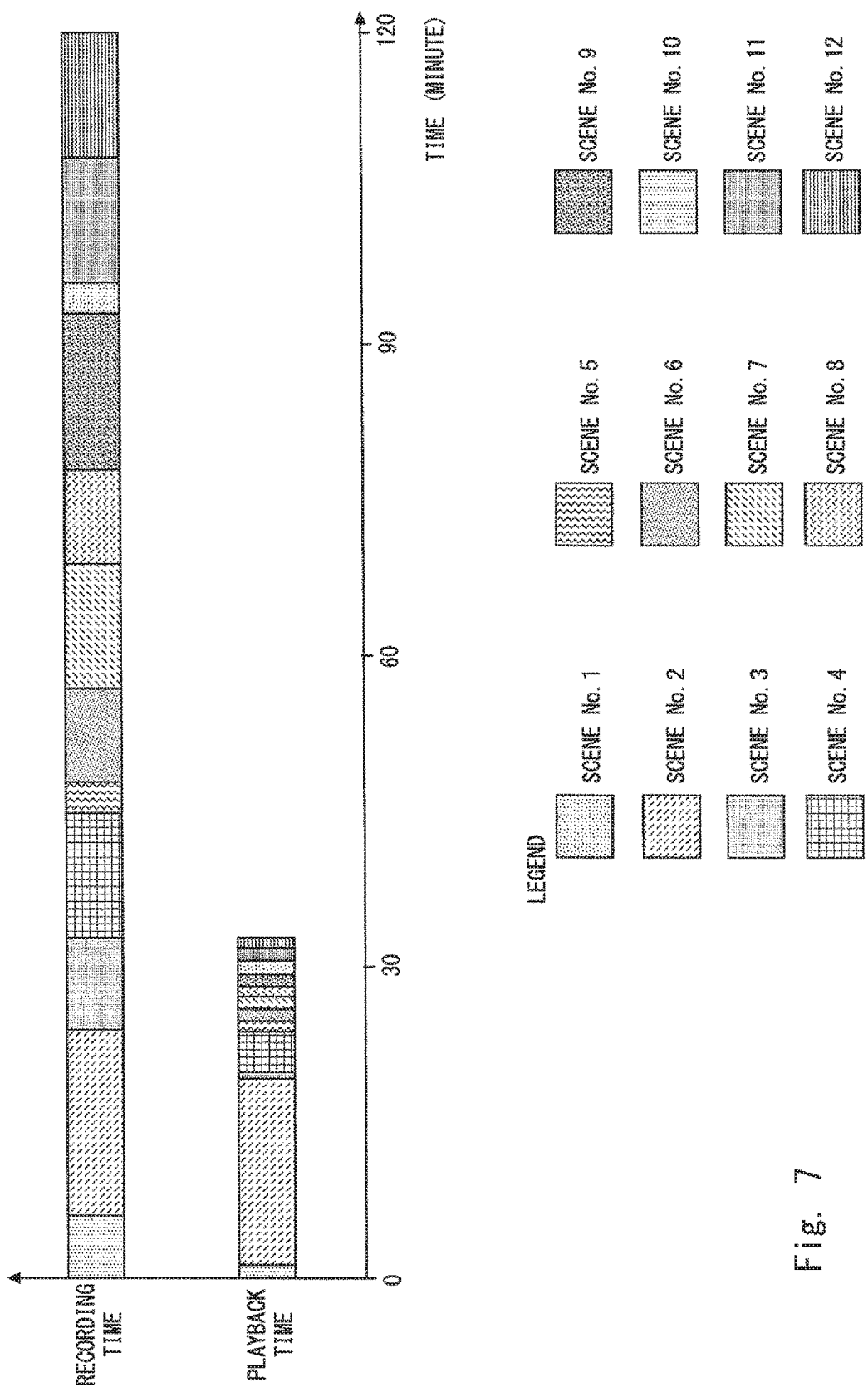
FIG. 7 is a view showing the relationship between a recording time and a playback time.

FIG. 7 shows the recording time and the playback time in the case where the first playback speed, the second playback speed and the third playback speed are set as above.

Note that, in Case 2, the recording time of the most important scene is longer than the initial value of the first set time by 3 minutes in the determination in Step S203 of FIG. 3, if the initial value of the first set time remains 15 minutes, the total playback time is 33 minutes.

Although one possible processing is to reduce the second set time and the third set time by the amount that the most important scene exceeds the first set time, because it is a rare case that does not usually occur in normal video shooting and further processing in the case where the most important scene is equal to or longer than the target playback time arises, such processing is not performed, and the first set time is set as the recording time of the most important scene.

Further, because the playback speed of the most important scene is 1× as a general rule, although the total playback time increases by the amount that the most important scene exceeds the first set time, the playback speed may be set so that it is within 30 minutes (at a speed of 33/30=1. 1× for 30 minutes) from the playback time that is finally calculated as postprocessing.

<Case 3>

In Case 3, an example in which there is no scene that is excluded because it is longer than the first set time and the determination in Step S207 of FIG. 3 results in No is described with reference to FIGS. 8 and 9.

At the beginning, as initially allocated values, the total playback time of scenes with a high level of importance (first set time) is set to 15 minutes, the total playback time of scenes with a low level of importance (second set time) is set to 10 minutes, and the total playback time of scenes with no tags (third set time) is set to 5 minutes.

First, because the total recording time (120 minutes) is longer than the target playback time (30 minutes), and it cannot be within the target playback time if the entire video is played back at 1× speed, the determination in Step S201 of FIG. 3 results in Yes, and it is thus necessary to set the playback speed to fall within the target playback time.

Next, the recording time of the most importance scene 5 is 3 minutes, which is shorter than the first set time (15 minutes), and therefore the determination in Step S203 of FIG. 3 results in Yes, and the first set time is not changed.

Then, the total recording time of the scenes 5, 1 and 10 where tags are placed is 12 minutes, which is shorter than the first set time (15 minutes), and therefore the total recording time of the scenes where tags are placed is within the first set time, the determination in Step S205 of FIG. 3 results in Yes, and therefore the scenes 5, 1 and 10 are set as the scenes S0 to S2 with a high level of importance. Note that J0 to Jm corresponding to the excluded scenes are not set.

Because there is no excluded scene and the determination in Step S207 of FIG. 3 results in NO, the third set time is set to 18 minutes by adding the value (13 minutes) obtained by adding the second set time (10 minutes) to the first set time (15 minutes) and then subtracting the recording time of S0 to S2 (12 minutes) to the third set time (5 minutes).

Further, in order to reduce the total recording time of the scenes with no tags (108 minutes) to be within the total playback time of the scenes with no tags (third set time) (18 minutes), the playback speed is set to 108/18=6×.

Then, when the second playback speed is not set, the determination in Step S214 of FIG. 3 is Yes as an exception. As a result, (the second playback speed and) the third playback speed are not changed. Then, the first playback speed is set to 1×, the second playback speed is not set, and the third playback speed is set to 6×.

Figure 9:
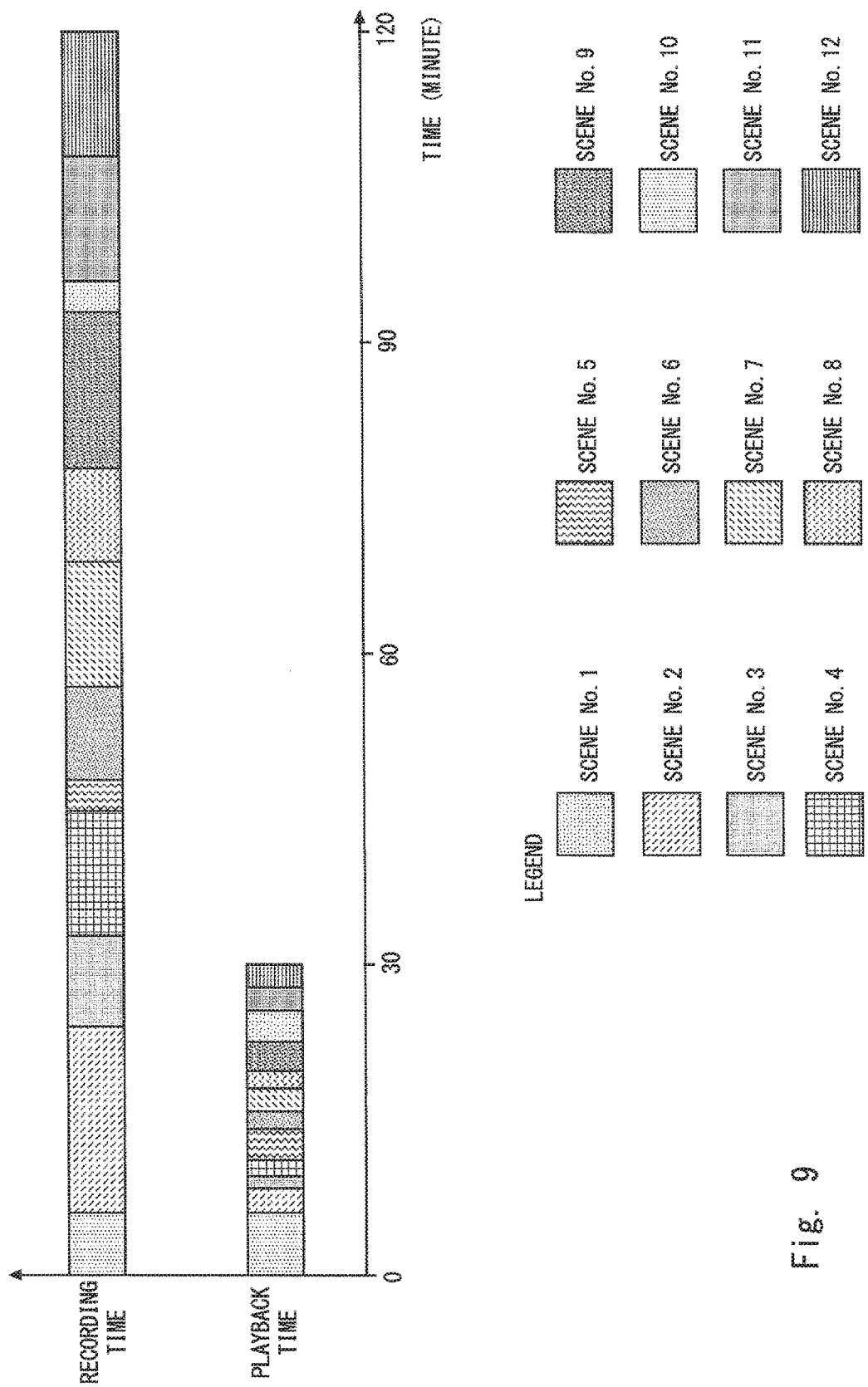
FIG. 9 is a view showing the relationship between a recording time and a playback time.

FIG. 9 shows the recording time and the playback time in the case where the first playback speed, the second playback speed and the third playback speed are set as above.

<Case 4>

In Case 4, an example in which the determination in Step S209 of FIG. 3 results in Yes is described with reference to FIGS. 10 and 11.

At the beginning, as initially allocated values, the total playback time of scenes with a high level of importance (first set time) is set to 15 minutes, the total playback time of scenes with a low level of importance (second set time) is set to 10 minutes, and the total playback time of scenes with no tags (third set time) is set to 5 minutes.

First, because the total recording time (120 minutes) is longer than the target playback time (30 minutes), and it cannot be within the target playback time if the entire video is played back at 1× speed, the determination in Step S201 of FIG. 3 results in Yes, and it is thus necessary to set the playback speed to fall within the target playback time.

Next, the recording time of the most importance scene 5 is 3 minutes, which is shorter than the first set time (15 minutes), and therefore the determination in Step S203 of FIG. 3 results in Yes, and the first set time is not changed.

Then, the total recording time of the scenes 5, 1, 10 and 3 where tags are placed is 21 minutes, which is longer than the first set time (15 minutes), and therefore the determination in Step S203 of FIG. 3 results in No. Because the total recording time of the scenes where tags are placed is not within the first set time, the scenes where tags are placed are excluded in ascending order of the level of importance by the loop processing of Steps S205 and S206. Then, because the total recording time of the scenes 5, 1 and 10 is 12 minutes, which is shorter than the first set time (15 minutes), the scenes 5, 1 and 10 are set as the scenes S0 to S2, and the scene 3 is set as the scene J0.

After that, because the scenes where tags are placed are not within the first set time, the determination in Step S207 of FIG. 3 results in Yes, and the second set time is set to 13 minutes by adding a value (3 minutes) obtained by subtracting the recording time of S0 (12 minutes) from the first set time (15 minutes) to the second set time.

Because the recording time of J0 (9 minutes) is shorter than the second set time (13 minutes), and the determination in Step S209 of FIG. 3 results in Yes, the playback speed of J0 is set to 1×.

Then, the third set time is set to 9 minutes by adding a value (4 minutes) obtained by subtracting the recording time of J0 (9 minutes) from the second set time (13 minutes) to the third set time.

Further, in order to reduce the total recording time of the scenes with no tags (99 minutes) to be within the total playback time of the scenes with no tags (third set time) (9 minutes), the playback speed is set to 99/9=11×.

Because the second playback speed (1×) is lower than the third playback speed (11×), and the determination in Step S214 of FIG. 3 results in Yes, the second playback speed and the third playback speed are not changed. Then, the first playback speed is set to 1×, the second playback speed is set to 1×, and the third playback speed is set to 11×.

Figure 11:
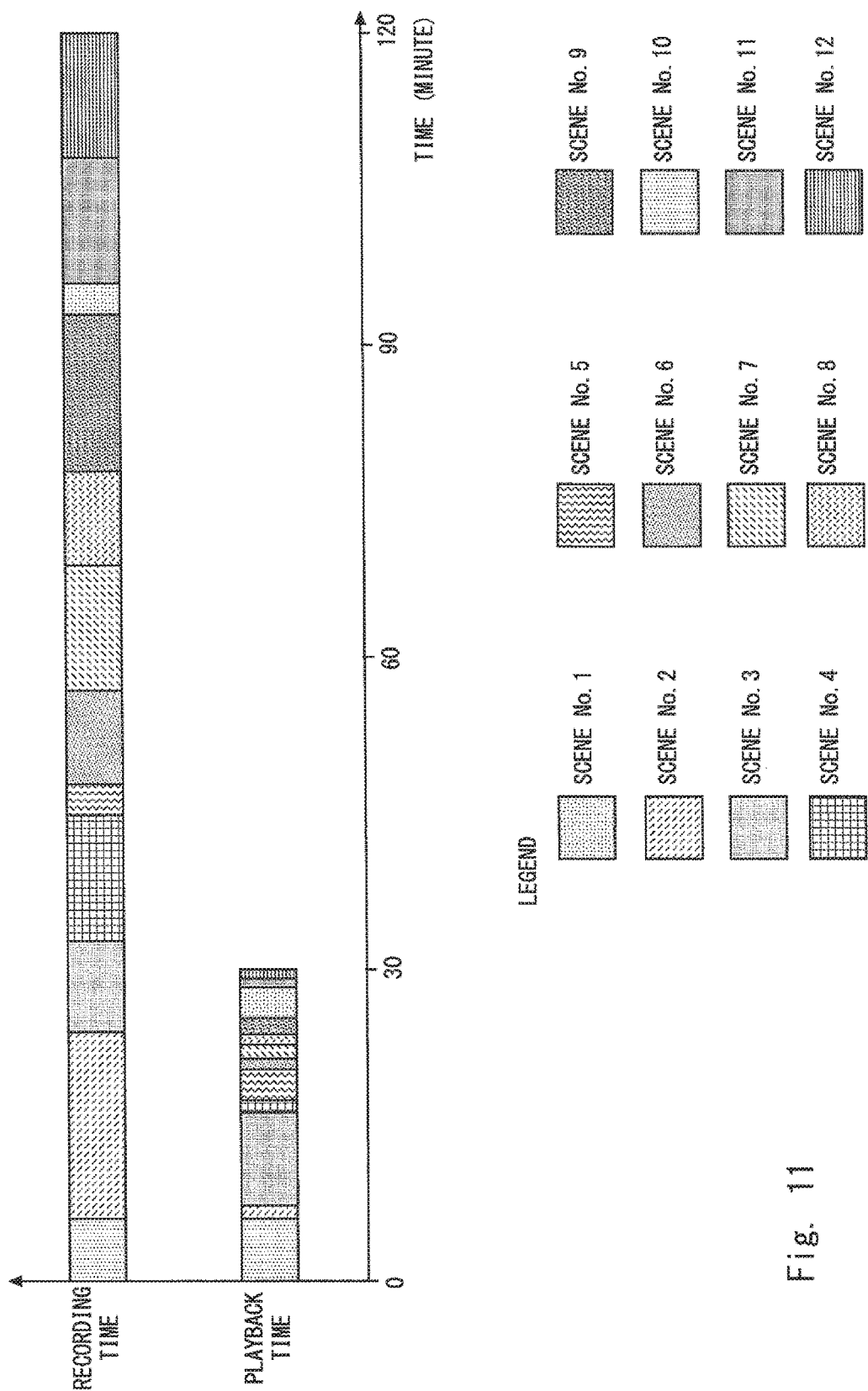
FIG. 11 is a view showing the relationship between a recording time and a playback time.

FIG. 11 shows the recording time and the playback time in the case where the first playback speed, the second playback speed and the third playback speed are set as above.

<Case 5>

In Case 5, an example in which the determination in Step S214 of FIG. 3 results in No is described with reference to FIGS. 12 and 13.

At the beginning, as initially allocated values, the total playback time of scenes with a high level of importance (first set time) is set to 15 minutes, the total playback time of scenes with a low level of importance (second set time) is set to 10 minutes, and the total playback time of scenes with no tags (third set time) is set to 5 minutes.

First, because the total recording time (120 minutes) is longer than the target playback time (30 minutes), and it cannot be within the target playback time if the entire video is played back at 1× speed, the determination in Step S201 of FIG. 3 results in Yes, and it is thus necessary to set the playback speed to fall within the target playback time.

Next, the recording time of the most importance scene 5 is 3 minutes, which is shorter than the first set time (15 minutes), and therefore the determination in Step S203 of FIG. 3 results in Yes, and the first set time is not changed.

Then, the total recording time of the scenes 5, 1, 10, 3, 9, 12, 7, 2, 6 and 4 where tags are placed is 99 minutes, which is longer than the first set time (15 minutes), and therefore the determination in Step S205 of FIG. 3 results in No. Because the total recording time of the scenes where tags are placed is not within the first set time, the scenes where tags are placed are excluded in ascending order of the level of importance by the loop processing of Steps S205 and S206. Then, because the total recording time of the scenes 5, 1 and 10 is 12 minutes, which is shorter than the first set time (15 minutes), the scenes 5, 1 and 10 are set as the scenes S0 to S2 with a high level of importance, and the excluded scenes 3, 9, 12, 7, 2, 6 and 4 are set as the scenes J0 to J6 with a low level of importance.

After that, because the scenes where tags are placed are not within the first set time, the determination in Step S207 of FIG. 3 results in Yes, and the second set time is set to 13 minutes by adding a value (3 minutes) obtained by subtracting the recording time of S0 to S2 (12 minutes) from the first set time (15 minutes) to the second set time.

Because the recording time of J0 to J6 (87 minutes) is longer than the second set time (13 minutes), and the determination in Step S209 of FIG. 3 results in No, in order to reduce the playback time of J0 to J6 to be within 13 minutes, the playback speed is set to 87/13=6.69×.

Further, in order to reduce the total recording time of the scenes with no tags (21 minutes) to be within the total playback time of the scenes with no tags (third set time) (5 minutes), the playback speed is set to 21/5=4.2×.

Because the second playback speed (6.69×) is higher than the third playback speed (4.2×), and the determination in Step S214 of FIG. 3 results in No, the second playback speed and the third playback speed are calculated again. To be specific, the second playback speed and the third playback speed are set to 108/18=6× in order to reduce the sum total (108 minutes) of the recording time of J0 to J6 (87 minutes) and the recording time of the scenes with no tags (21 minutes) to be within the sum (18 minutes) of the second playback time and the third playback time.

Then, the first playback speed is set to 1×, the second playback speed is set to 6×, and the third playback speed is set to 6×.

Figure 13:
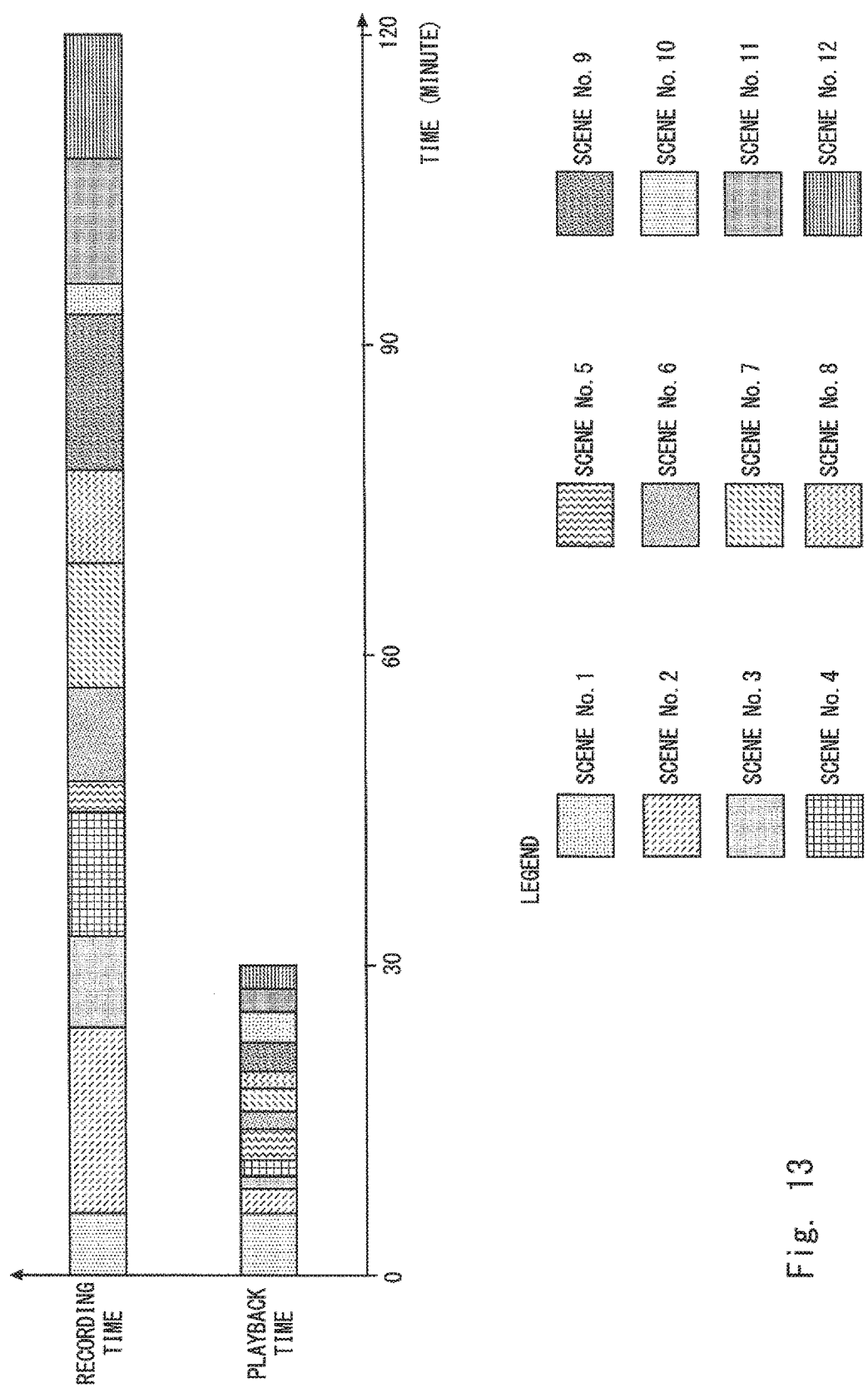
FIG. 13 is a view showing the relationship between a recording time and a playback time.

FIG. 13 shows the recording time and the playback time in the case where the first playback speed, the second playback speed and the third playback speed are set as above.

<Case 6>

In Case 6, an example in which tags are placed on all scenes is described with reference to FIGS. 14 and 15.

At the beginning, as initially allocated values, the total playback time of scenes with a high level of importance (first set time) is set to 15 minutes, the total playback time of scenes with a low level of importance (second set time) is set to 10 minutes, and the total playback time of scenes with no tags (third set time) is set to 5 minutes.

First, because the total recording time (120 minutes) is longer than the target playback time (30 minutes), and it cannot be within the target playback time if the entire video is played back at 1× speed, the determination in Step S201 of FIG. 3 results in Yes, and it is thus necessary to set the playback speed to fall within the target playback time.

Next, the recording time of the most importance scene 5 is 3 minutes, which is shorter than the first set time (15 minutes), and therefore the determination in Step S203 of FIG. 3 results in Yes, and the first set time is not changed.

Then, the total recording time of the scenes 5, 1, 10, 3, 9, 12, 7, 2, 6, 4, 8 and 11 where tags are placed is 120 minutes, which is longer than the first set time (15 minutes), and therefore the determination in Step S205 of FIG. 3 results in No. Because the total recording time of the scenes where tags are placed is not within the first set time, the scenes where tags are placed are excluded in ascending order of the level of importance by the loop processing of Steps S205 and S206. Then, because the total recording time of the scenes 5, 1 and 10 is 12 minutes, which is shorter than the first set time (15 minutes), the scenes 5, 1 and 10 are set as the scenes S0 to S2 with a high level of importance, and the excluded scenes 3, 9, 12, 7, 2, 6, 4, 8 and 11 are set as the scenes J0 to J8 with a low level of importance.

After that, because the determination in Step S207 of FIG. 3 results in Yes, the second set time is set to 13 minutes by adding a value (3 minutes) obtained by subtracting the recording time of S0 to S2 (12 minutes) from the first set time (15 minutes) to the second set time.

Because the recording time of J0 to J8 (108 minutes) is longer than the second set time (13 minutes), and the determination in Step S209 of FIG. 3 results in No, in order to reduce the playback time of J0 to J8 to be within 13 minutes, the playback speed is set to 108/13=8.3×. Further, because there is no scene with no tag (third set time), the third playback speed is not set.

When the third playback speed is not set, the determination in Step S214 of FIG. 3 is No as an exception. As a result, the second playback speed (and the third playback speed) are calculated again. To be specific, the second playback speed is set to 108/18=6× in order to reduce the recording time of J0 to J8 (108 minutes) to be within the sum (18 minutes) of the second playback time and the third playback time.

Then, the first playback speed is set to 1×, the second playback speed is set to 6×, and the third playback speed is not set.

Figure 15:
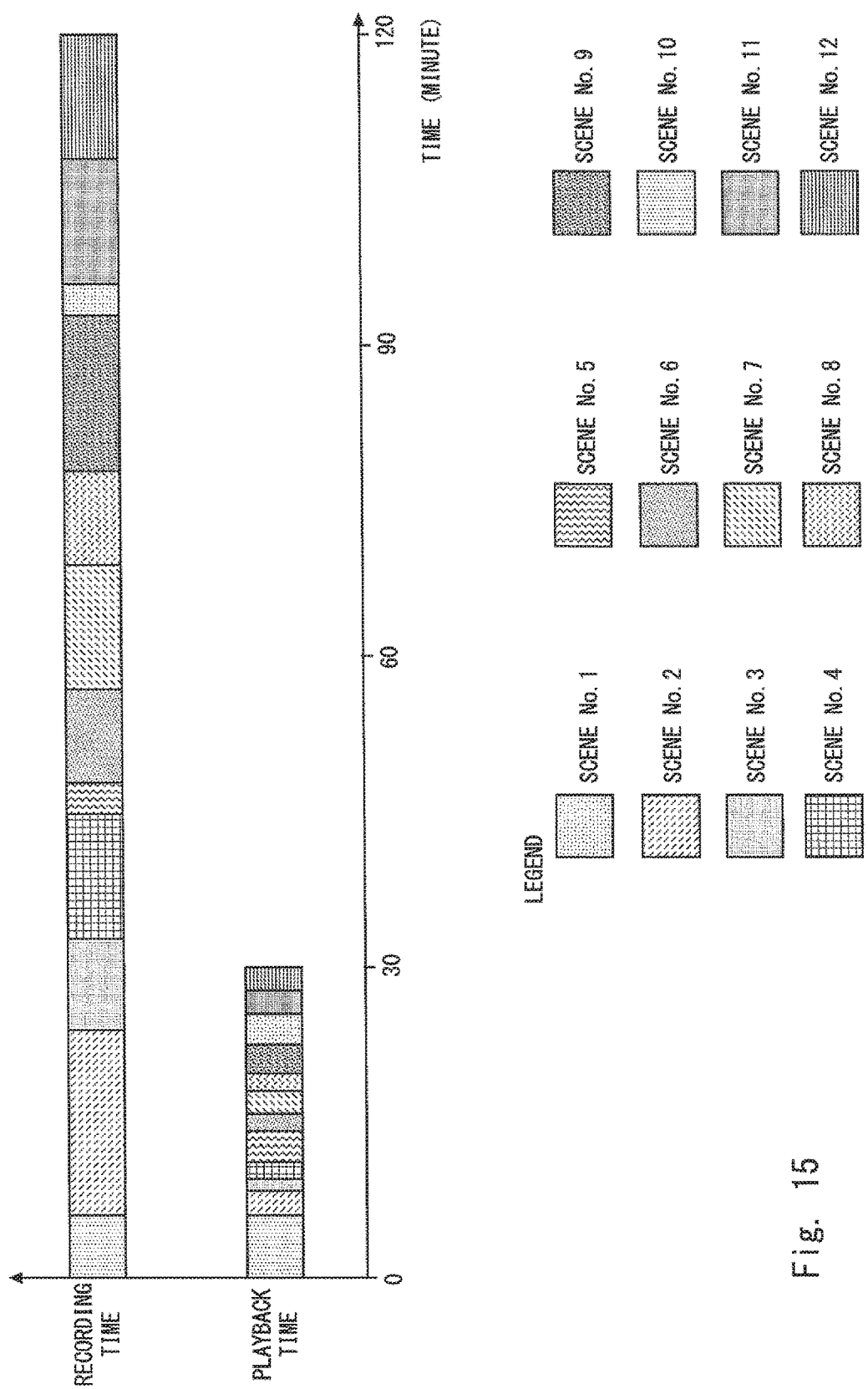
FIG. 15 is a view showing the relationship between a recording time and a playback time.

FIG. 15 shows the recording time and the playback time in the case where the first playback speed, the second playback speed and the third playback speed are set as above.

<Case 7>

In Case 7, an example in which tags are not placed at all is described with reference to FIGS. 16 and 17.

At the beginning, as initially allocated values, the total playback time of scenes with a high level of importance (first set time) is set to 15 minutes, the total playback time of scenes with a low level of importance (second set time) is set to 10 minutes, and the total playback time of scenes with no tags (third set time) is set to 5 minutes.

First, because the total recording time (120 minutes) is longer than the target playback time (30 minutes), and it cannot be within the target playback time if the entire video is played back at 1× speed, the determination in Step S201 of FIG. 3 results in Yes, and it is thus necessary to set the playback speed to fall within the target playback time.

The recording time of the most importance scene is 0 minute, and because there is no scene where a tag is placed, it is shorter than the first set time (15 minutes), and therefore the determination in Step S203 of FIG. 3 results in Yes, and the first set time is not changed.

There is no video with a high level of importance, and the recording time of such a scene is 0 minute, and therefore the determination in Step S205 of FIG. 3 results in Yes.

Because there is no excluded scene and the determination in Step S207 of FIG. 3 results in No, the third set time is set to 30 minutes by adding a result of adding the second set time to the first set time and subtracting the recording time of S0 . . . (0 minute) to the third set time (5 minutes).

The third playback speed is (the total recording time 120 minutes/30 minutes)=4×.

Because the second playback speed is not set and the determination in Step S214 of FIG. 3 results in Yes, the second playback speed and the third playback speed are not changed. Then, the first playback speed is set to 1× (note that, however, there is no corresponding scene), the second playback speed is not set, and the third playback speed is set to 4×.

Figure 17:
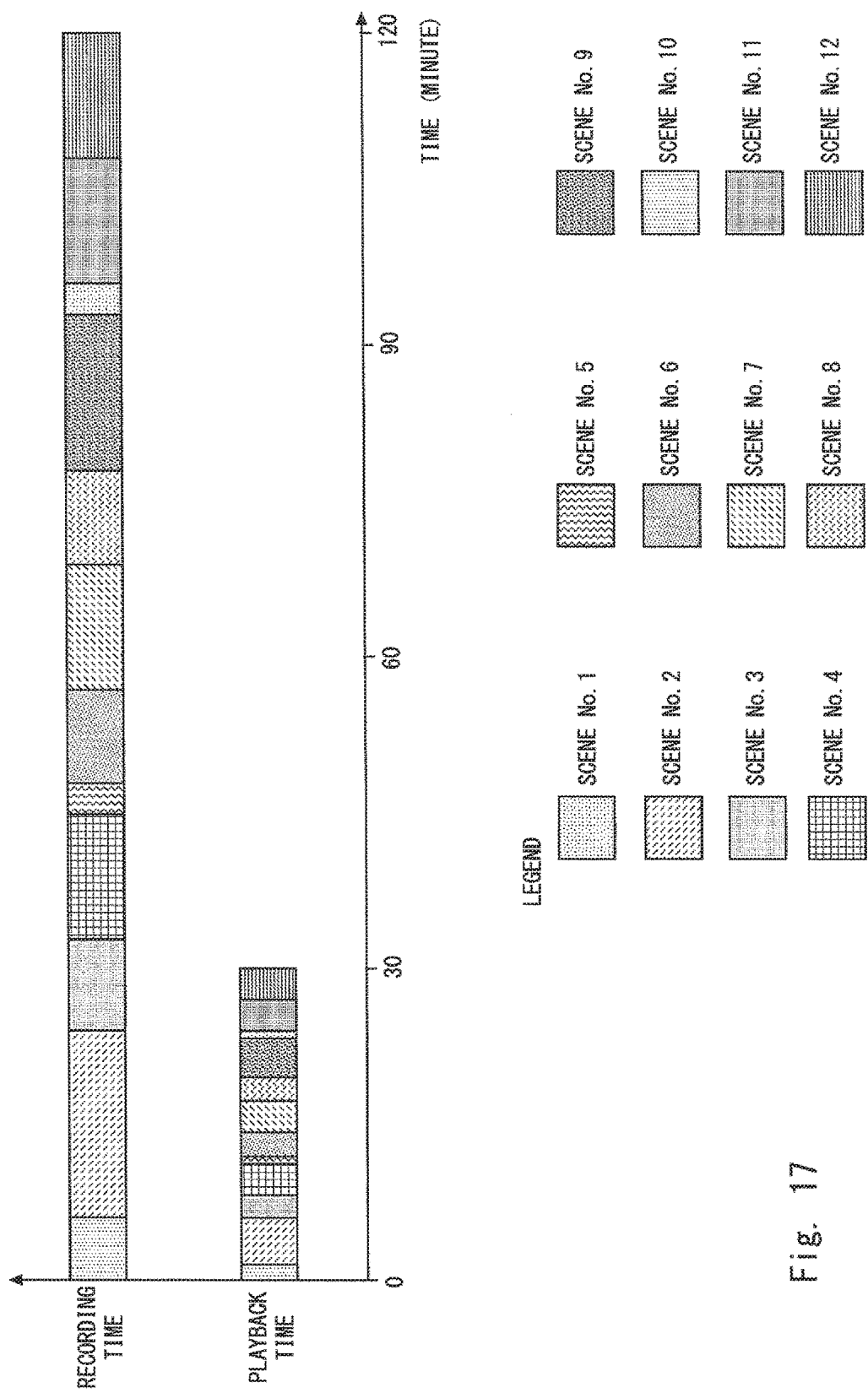
FIG. 17 is a view showing the relationship between a recording time and a playback time.

FIG. 17 shows the recording time and the playback time in the case where the first playback speed, the second playback speed and the third playback speed are set as above.

<Case 8>

In Case 8, an example in which the determination in Step S201 of FIG. 3 results in No is described.

First, because the total recording time is shorter than the target playback time, and it can be within the target playback time if the entire video is played back at 1× speed, the determination in Step S201 of FIG. 3 results in No, and all of the scenes are played back at 1× speed without any setting on the playback time.

As described above, in the playback device according to this embodiment, scenes which a person who has taken the video thinks important are played back at low playback speed so as to fully view the content, and scenes which the person thinks less important are played back at high playback speed so as to reduce the time, and it is thereby possible to view the entire recorded data which the person wants to play back within a limited length of time.

Further, in the playback device according to this embodiment, scenes where tags are placed are played back at low playback speed so as to fully view the content, and scenes where tags are not placed are played back at high playback speed so as to reduce the playback time, and it is thereby possible to view the entire recorded data at a playback speed in accordance with the level of importance within a limited length of time.

Furthermore, in the playback device according to this embodiment, important scenes where tags are placed are played back at low playback speed so as to fully view the content, and less important scenes where tags are placed are played back at high playback speed and further scenes where tags are not placed are played back at still higher playback speed so as to reduce the playback time, and it is thereby possible to view the entire recorded data which the person wants to play back within a limited length of time.

Data to be associated with a tag is not limited to video data, and any data containing audio or video, or both audio and video may be used.

Hereinafter, one example of creation of video data to be played back by the playback device 100, tags, and information about the level of importance is described.

A tagging system according to this embodiment is described hereinbelow. The tagging system according to this embodiment is a system that, when a user takes a video of a sports game or the like, accurately sets tags to important ranges and important frames of data taken by using vital data (biometric information) of the user and tag data that is input by tagging of scenes which the user thinks important. The level of importance of each scene may be defined based on tags assigned by this tagging system.

First, the configuration of the tagging system according to this embodiment is described hereinafter.

Figure 18:
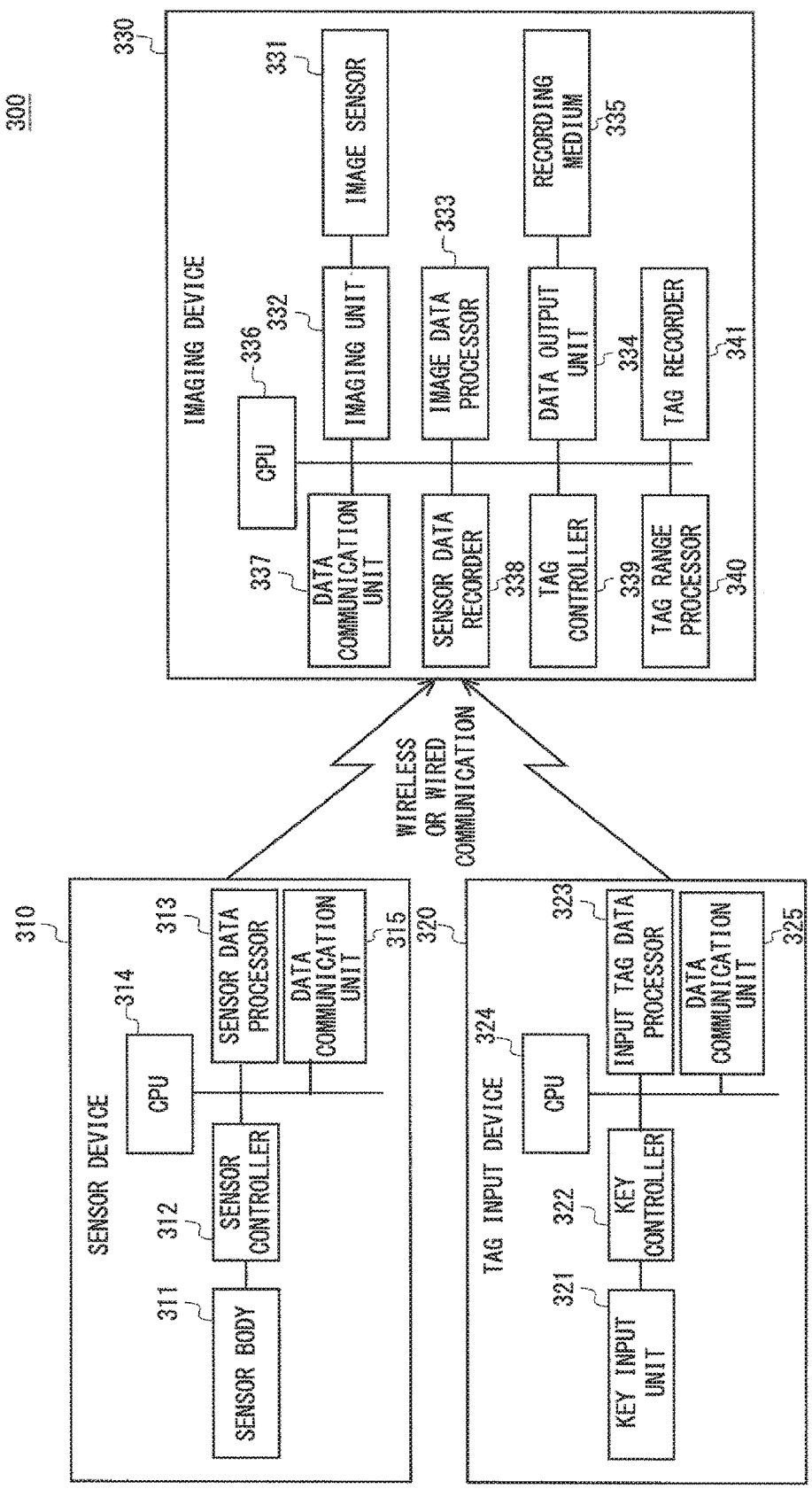
FIG. 18 is a block diagram showing the schematic configuration of a tagging system according to the embodiment.

FIG. 18 is a block diagram showing the schematic configuration of a tagging system 300 according to this embodiment.

The tagging system 300 includes a sensor device 310, a tag input device 320, an imaging device 330 and the like. The sensor device 310 and the imaging device 330, and the tag input device 320 and the imaging device 330 can communicate with each other by wired or wireless connections.

The sensor device 310 is a device that, when a user (not shown) takes a video using the imaging device 330, measures the heart rate, which is the vital data of the user. The sensor device 310 includes a data communication unit 315 that transmits the measured heart rate to the imaging device 330 in real time, in addition to elements typically included in a sensor device, such as a sensor body 311, a sensor controller 312, a sensor data processor 313 and a CPU 314.

The tag input device 320 is a device for a user who takes a video using the imaging device 330 to input a tag by pressing a button or the like at the moment where the user desires to place a tag, such as the moment a goal is scored in a football game, for example. The tag input device 320 includes a data communication unit 325 that transmits input tag data, which is data of a tag input by a user, to the imaging device 330 in real time, in addition to elements typically included in a tag input device, such as a key input unit 321 such as a button and a screen, a key controller 322, an input tag data processor 323 and a CPU 324.

The imaging device 330 is a device that can take a video such as a video camera or a digital camera. The imaging device 330 includes a data communication unit 337, a sensor data recorder 338, a tag controller 339, a tag range processor 340, a tag recorder 341 and the like, in addition to elements typically included in an imaging device, such as an image sensor 331, an imaging unit 332, an image data processor 333, a data output unit 334, a recording medium 335 and a CPU 336.

The data communication unit 337 receives sensor data transmitted from the data communication unit 315 of the sensor device 310, input tag data transmitted from the data communication unit 325 of the tag input device 320 and the like. Further, the data communication unit 337 may transmit a signal for controlling the timing to start the operation or the like to the sensor device 310, the tag input device 320 and the like. Specifically, the data communication unit 315 of the sensor device 310 and the data communication unit 325 of the tag input device 320 may communicate a control signal, a status notification signal or the like in one way or two ways with the data communication unit 337 of the imaging device 330.

The sensor data recorder 338 records sensor data received from the sensor device 310.

The tag controller 339 controls the tag assignment (tagging method) in the imaging device 330.

The tag range processor 340 sets, as a tag range, an appropriate range of video data taken by the imaging device 330, which is, when the vital data is equal to or more than a preset threshold at the timing when a tag is recorded, for example, the period where it is equal to or more than the threshold, by using the received sensor data and input tag data. The tag range processor 340 can set a tag range while taking a video. Further, the tag range processor 340 may set a tag range when playing back a video.

The tag recorder 341 records the received sensor data and input tag data and the set tag range in association with video data when taking a video or playing back a video. Further, the tag recorder 341 assigns a tag in the set tag range and records the timing data.

The received sensor data and input tag data, the set tag range data, the video data associated with them and the like may be recorded in the recording medium 335.

The input tag data includes the time when a user inputs a tag and the time when the imaging device 330 receives a tag, for example. The input tag data is not necessarily the time, and when the sensor device 310, the tag input device 320 and the imaging device 330 can share certain synchronous timing such as the start of recording, information about the elapsed time from that point of time may be used instead.

Note that, if the sensor device 310, the tag input device 320 and the imaging device 330 include a clock, the sensor device 310 and the tag input device 320 do not need to transmit the measured heart rate and the input tag data to the imaging device 330 in real time. The timings of the video data, the vital data and the input tag data may be matched later based on their clock information.

Further, the elements in the imaging device 330 can be implemented by executing a program under control of the CPU 336. To be more specific, the imaging device 330 loads a program stored in a storage unit (not shown) to a main storage device (not shown), executes the program under control of the CPU 336 and thereby implements the elements. Further, the elements may be implemented by any combination of hardware, firmware and software, not limited to software by a program.

The operation of the tagging system 300 according to this embodiment, which is a tagging method, is described hereinafter. The operation of the tag range processor 340 is mainly described below.

First, the overview of the tag range setting operation of the tag range processor 340 is described. As described above, the tag range processor 340 sets a tag in an appropriate range of video data taken by the imaging device 330 by using the received sensor data and input tag data.

Figure 19:
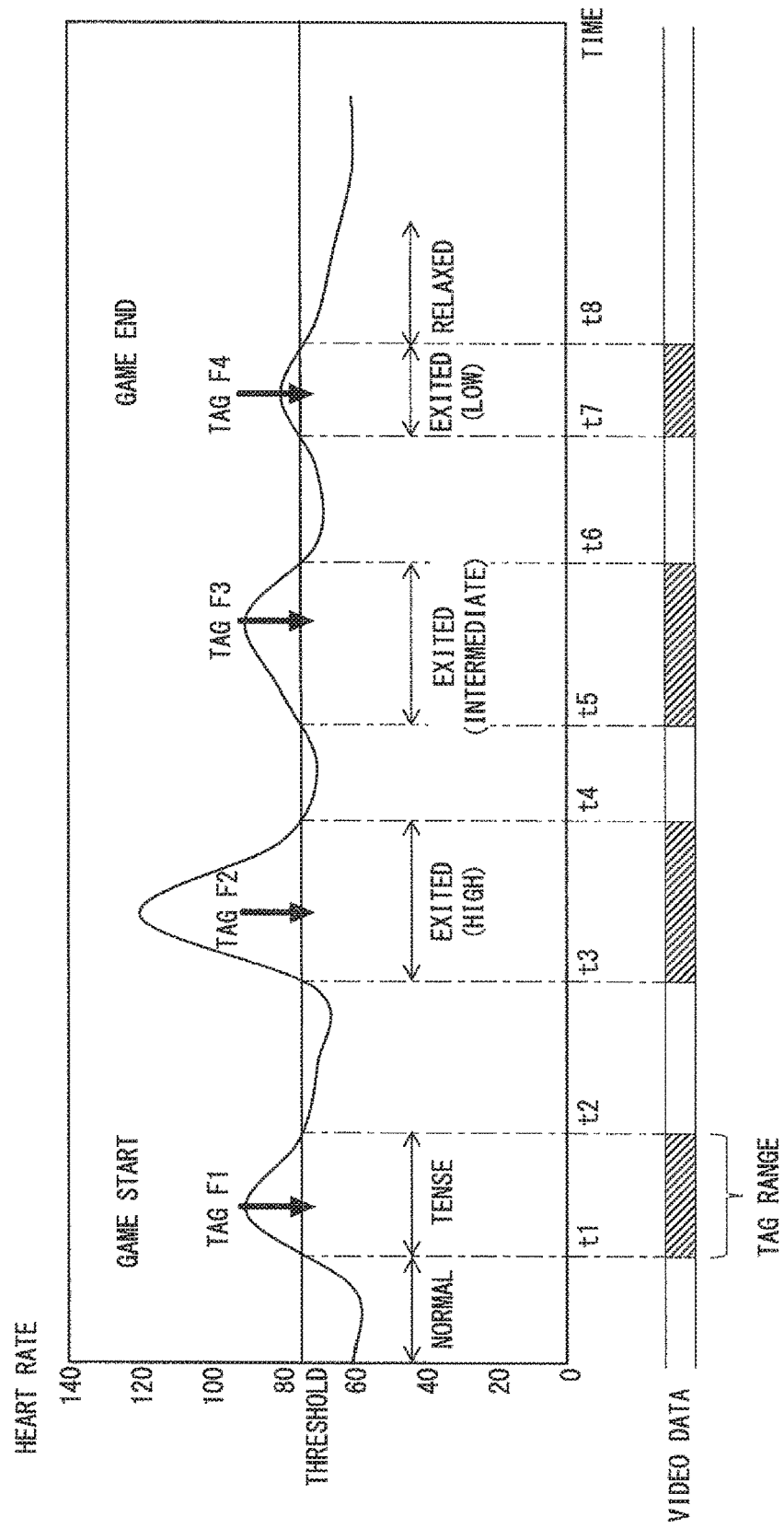
FIG. 19 is a view showing the relationship between a change in heart rate over time and the range of a tag according to the embodiment.

FIG. 19 is a view showing the relationship between a change in heart rate over time and the range of a tag according to the embodiment. The graph of a heart rate with input tag data is shown in the upper part of FIG. 19, and a tag range that is set based on the input tag data is shown in association with video data in the lower part of FIG. 19. The horizontal axis of the heart rate graph indicates time, and the vertical axis indicates a heart rate. Further, the horizontal line drawn at a heart rate of about 75 indicates a threshold for setting a tag range. Further, the horizontal arrow that is placed at a heart rate of about 40 and the text such as "normal" and "tense" indicate the state of a user at that time.

In the example of the heart rate shown in FIG. 19, the state of a user changes from normal, tense or excited and normal (relaxed) again from the start to the end of a game based on a change in heart rate. In the tense or excited state, four peaks (1 to 4) of the heart rate occur, and the user inputs tags F1 to F4 at the respective peaks.

The tag range processor 340 sets, as the range of a tag F input by a user, a time range where the heart rate is equal to or more than a specified value (which is a threshold of 75 in this example) and in which the user inputs the tag F.

For example, as for the first peak, because the heart rate exceeds the specified value and the user inputs the tag F1 in the time range t1 to t2, the time range t1 to t2 is set as the tag range of the tag F1. Further, as for the second peak, because the heart rate exceeds the specified value and the user inputs the tag F2 in the time range t3 to t4, the time range t3 to t4 is set as the tag range of the tag F2. The same applies to the third and fourth peaks.

Note that, even when the heart rate is equal to or more than a specified value in a certain tag range, the tag range processor 340 does not set the time range as a tag range if a user does not input the tag F in that time range.

Further, even when a user inputs the tag F in a certain time range, the tag range processor 340 does not set the time range as a tag range if the heart rate is not equal to or more than a specified value in that time range.

The detailed procedure of the tag range processor 340 is described hereinafter.

Figure 20:
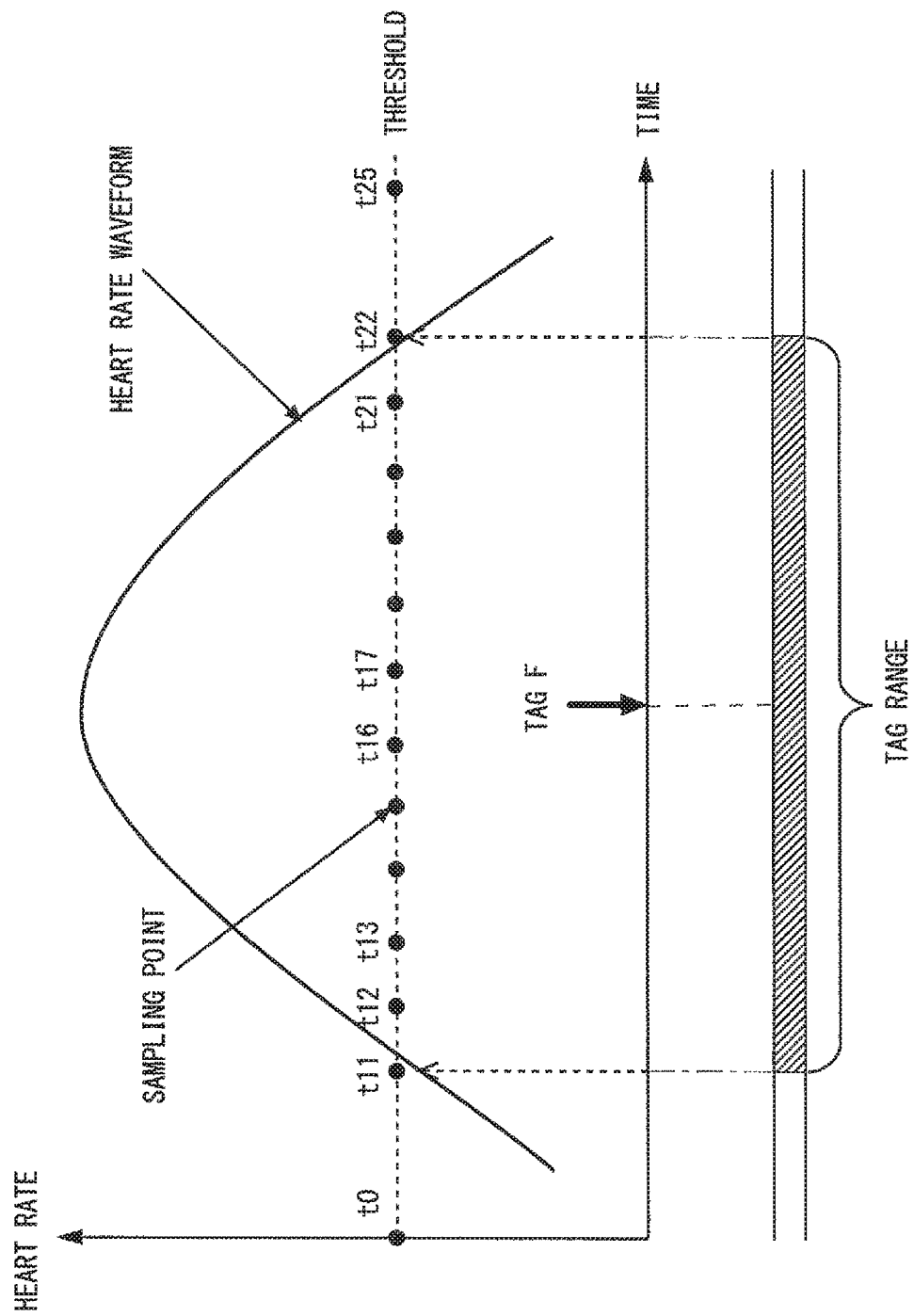
FIG. 20 is a view showing the detailed relationship between a change in heart rate over time and the range of a tag according to the embodiment.

FIG. 20 is a view showing the detailed relationship between a change in heart rate over time and the range of a tag according to this embodiment. The heart rate graph is shown in the upper part, and the tag range is shown in the lower part of FIG. 20. The horizontal dotted line in the graph indicates a threshold, and the equally spaced points on the horizontal dotted line indicate sampling points, which is sampling time, of the heart rate. Note that sampling of the heart rate is done at intervals of 1 second, for example.

Figure 21:
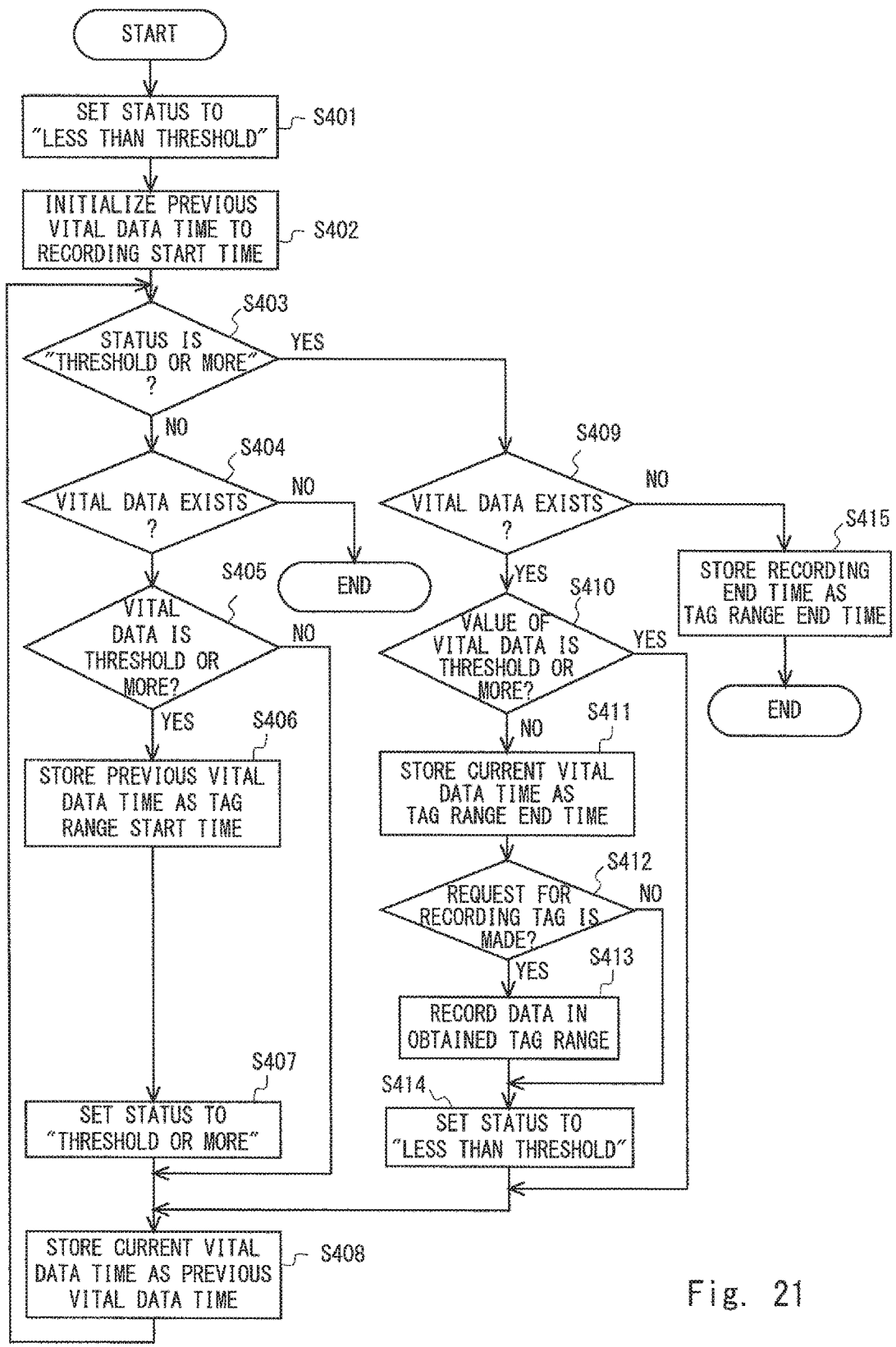
FIG. 21 is a flowchart showing the detailed procedure of a tag range processor according to the embodiment.

FIG. 21 is a flowchart showing the detailed procedure of the tag range processor 340 according to this embodiment.

The detailed procedure of the tag range processor 340 is described hereinafter with reference to FIGS. 20 and 21.

When the process starts, "status" indicating the status of vital data is set to "less than threshold" (Step S401), and "previous vital data time value" is initialized to a recording start time t0 (Step S402).

At the sampling time t0, it is determined whether the status is "threshold or more" (Step S403). Because the status remains "less than threshold" set in Step S401 (No in Step S403), it is determined whether there is the received vital data at the time t0 (Step S404).

Because the received vital data exists at the time t0 (Yes in Step S404), it is determined whether the value of the vital data at the time t0 is equal to or more than the threshold (Step S405). As shown in FIG. 20, because the value of the vital data at the time t0 is less than the threshold (No in Step S405), the current vital data time t0 is stored as "previous vital data time value" (Step S408). Then, the process returns to Step S403. The same processing is repeated until the time t11 because it is in the normal state where the vital data is less than the threshold.

At the sampling time t12, because the status is "less than threshold" and the vital data at t12 exists (No in Step S403 and Yes in Step S404), it is determined whether the value of the vital data at the time t12 is equal to or more than the threshold (Step S405). As shown in FIG. 20, because the value of the vital data at the time t12 is equal to or more than the threshold (Yes in Step S405), "previous vital data time value", which is the time t11 stored in Step S408, is stored as "tag range start time value" (Step S406), the status is set to "threshold or more" (Step S407), the current vital data time t12 is stored as "previous vital data time value" (Step S408), and then the process returns to Step S403.

Then, at the sampling time t13, because the status is "threshold or more" as set in Step S407 (Yes in Step S403), it is determined whether there is the vital data at the time t13 (Step S409).

Because the received vital data exists at the time t13 (Yes in Step S409), it is determined whether the value of the vital data at the time t13 is equal to or more than the threshold (Step S410). As shown in FIG. 20, because the value of the vital data at the time t13 is equal to or more than the threshold (Yes in Step S410), the current vital data time t13 is stored as "previous vital data time value" (Step S408), and the process returns to Step S403.

The same processing as at the time t13 continues until the sampling time t21.

At the sampling time t22, because the status is "threshold or more" and the received vital data at t22 exists (Yes in Step S403 and Yes in Step S409), it is determined whether the value of the vital data at the time t22 is equal to or more than the threshold (Step S410). As shown in FIG. 20, because the value of the vital data at the time t22 is less than the threshold (No in Step S410), the current vital data time t22 is stored as "tag range end time value" (Step S411), and it is determined whether there is a request for recording a tag, which is, whether a tag is input when the value of the vital data is equal to or more than the threshold (Step S412). As shown in FIG. 20, because a user inputs the tag F between the time t16 and the time t17 (Yes in Step S412), the tag F is recorded in the tag range "tag range start time value" t11 to "tag range end time value" t22 obtained in Steps S406 and S411 (Step S413), the status is set to "less than threshold" (Step S414), the current vital data time t22 is stored as "previous vital data time value" (Step S408), and then the process returns to Step S403.

Then, at the sampling time t25, because the status is "less than threshold" and the vital data at t25 does not exist (No in Step S403 and No in Step S404), the process ends.

Note that the current vital data time t is stored as "tag range end time value" (Step S411), and when there is no request for recording a tag, which is when a user does not input a tag (No in Step S412), the status is set to "less than threshold" (Step S414). Thus, as described above, even when there is a time range where the heart rate is equal to or more than a specified value, the time range is not set as a tag range if a user does not input the tag in that time range.

Further, when the status is "threshold or more" and the vital data at that time t does not exist (Yes in Step S403 and No in Step S409), the recording end time is stored as "tag range end time value" (Step S415), and when there is a request for recording a tag, the tag F is recorded in the obtained tag range and then the process ends, and when there is no request for recording a tag, the process ends as in Steps S412 and S413.

The tagging system 300 according to this embodiment can thereby accurately assign a tag in an important range while taking video data.

Note that, although the tagging system 300 according to this embodiment selects the time t11 to t22 as the time range where the heart rate exceeds a threshold and sets this time range as the tag range, it may select the time t12 to time t21 respectively corresponding to the next and previous sampling time as the tag range. As a matter of course, the time t11 to t21 or the time t12 to t22 may be selected as the time range, and further a range between intersection points where the heart rate exceeds a threshold may be selected as the time range. In this case, the intersections may be calculated, and the sampling number of a video and the sampling number of vital data may be set to be the same.

Further, although a threshold of the heart rate for setting the tag range is fixed in the tagging system 300 according to this embodiment, the threshold may be set depending on situation such as for each user or for each scene. Further, the threshold may be made variable at any time, so that the tag range can be adjusted even after recording video data.

Further, in the tagging system 300 according to this embodiment, when the heart rate is equal to or more than a specified value and a user inputs a tag in a certain time range, the time range is set as the tag range. However, when the heart rate is equal to or more than a specified value and a user inputs a tag in a certain time range, a specified time before and after the tag input by the user, which is 3 seconds before and after the tag, for example, may be set as the tag range. As a matter of course, a user may select the time range where the heart rate is equal to or more than a specified value or the specified time before and after the tag.

Further, although the heart rate is used as the vital data in the tagging system 300 according to this embodiment, data other than the heart rate, such as data indicating the degree of excitement of a user, may be used as the vital data, and in this case, when a time range where the vital data is equal to or less than a threshold or less than a threshold and where a user inputs a tag may be set as the tag range.

Further, although the tagging system 300 according to this embodiment includes the sensor device 310, the tag input device 320, the imaging device 330 and the like, the imaging device may serve also as the sensor device and the tag input device, or the imaging device may serve also as one of the sensor device and the tag input device. In other words, the tagging system may be configured as a tagging device.

Further, although the tagging system 300 according to this embodiment sets a tag range based on user's vital data and input tag data when the user takes a video using the imaging device 330, which is, when the user records video data, it may set a tag range based on user's vital data and input tag data when the user views or edits a video using an image processing device or the like, which is, when the user plays back video data. Thus, the tagging device according to this embodiment is not limited to an imaging device, and it may be an image processing device or the like.

As described above, the imaging device 330 according to this embodiment includes the data communication unit 337 that continuously receives vital data of a user who records or plays back video data and also receives timing data about tag input by the user, and the tag range processor 340 that, when a time corresponding to the timing data is included in a time range where the vital data received by the data communication unit 337 is equal to or more than a present value, sets the time range as a tag range.

Further, the tagging system 300 according to this embodiment includes the sensor device 310 that measures and outputs vital data of a user to the data communication unit 337, the tag input device 320 that outputs timing data to the data communication unit 337, and the imaging device 330.

A tagging method according to this embodiment includes a data communication step of continuously receiving vital data of a user who records or plays back video data and also receiving timing data about tag input by the user, and a tag range processing step S412 and S413 of, when a time corresponding to the timing data is included in a time range where the vital data received in the data communication step is equal to or more than a present value, setting the time range as a tag range.

A program according to this embodiment causes a computer to execute a data communication procedure that continuously receives vital data of a user who records or plays back video data and also receives timing data about tag input by the user, and a procedure S412 and S413 that, when a time corresponding to the timing data is included in a time range where the vital data received in the data communication procedure is equal to or more than a present value, sets the time range of video data as a tag range.

The level of importance of each scene in video data may be defined based on a tag assigned by the above-described tagging system. For example, the level of importance may be defined by a tag time range, a peak value of vital data, the integral of vital data with a tag time range or the like.

Further, although two levels of importance, high and low, and three types of playback speed, a playback speed of a scene with a high level of importance, a playback speed of a scene with a low level of importance, and a playback speed of a scene where a tag is not assigned are used in the above-described embodiment, the number of levels of importance may increase to three or four, and four or five types of playback speed may be used accordingly.

Further, the data input/output unit 103, the tag data processor 104, the playback controller 105, the image data processor 106, the key controller 108 and the display controller 110 in the above-described embodiment may be implemented by hardware such as ASIC (Application Specific Integrated Circuit) or software. Further, a part of the processing may be implemented by software and the other part may be implemented by hardware. In the implementation by software, a computer system that includes one or a plurality of CPU (Central Processing Unit) such as a microprocessor executes a program related to processing of functional blocks. Such a program can be stored and provided to the computer using any type of non-transitory computer readable medium. The non-transitory computer readable medium includes any type of tangible storage medium. Examples of the non-transitory computer readable medium include magnetic storage media (such as floppy disks, magnetic tapes, hard disk drives, etc.), optical magnetic storage media (e.g. magneto-optical disks), CD-ROM (Read Only Memory), CD-R , CD-RAY, DVD-ROM (Digital Versatile Disc Read Only Memory), DVD-R (DVD Recordable)), DVD-R DL (DVD-R Dual Layer)), DVD-RW (DVD ReWritable)), DVD-RAM), DVD+R), DVR+R DL), DVD+RW), BD-R (Blu-ray (registered trademark) Disc Recordable)), BD-RE (Blu-ray (registered trademark) Disc Rewritable)), BD-ROM), and semiconductor memories (such as mask ROM, PROM (Programmable ROM), EPROM (Erasable PROM), flash ROM, RAM (Random Access Memory), etc.). The program may be provided to a computer using any type of transitory computer readable medium. Examples of the transitory computer readable medium include electric signals, optical signals, and electromagnetic waves. The transitory computer readable medium can provide the program to a computer via a wired communication line such as an electric wire or optical fiber or a wireless communication line.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

What is claimed is:

1. A playback device comprising:
   a playback controller implemented by hardware that sets playback speeds for plurality of scenes of video data based on a level of importance of each scene, a first set time that is set as initial total playback time of a first scene assigned a higher level of importance, and a second set time that is set as an initial total playback time of a second scene assigned a lower level of importance, wherein the plurality of scenes comprises scenes to which a level of importance is assigned; and an image data processor implemented by hardware that converts the video data into video data for playback at a playback speed set by the playback controller for each scene, wherein the playback controller:

sets a playback speed of a third scene that assigned as the most important scene of the plurality of scenes to 1×playback speed, wherein the third scene comprises a playback time that is the third scene played back at 1×playback speed, when the playback time of the third scene is longer than the first set time:

defines the second scene as a subset of scenes of the plurality of scenes to which information about the level of importance is assigned as lower than the third scene, and sets the playback speed of the second scene such that the second scene is played back within the second set time, and when the playback time of the third scene is equal to or shorter than the first set time:

sets a playback speed of a scene to 1×playback speed, the scene comprising all scenes of the plurality of scenes that can be played back within the first set time when played back at 1×playback speed in descending order of importance including and subsequent to the third scene, defines the second scene comprising the remaining scenes of the plurality of scenes to which a level of importance is assigned that cannot be played back within the first set time at 1×playback speed, and sets a playback speed of the second scene such that the second scene is played back within a time obtained by adding a time difference to the second set time, the time difference obtained by subtracting the total playback time of the scenes played at 1×speed from the first set time.

2. The playback device according to claim 1, wherein the playback controller sets a playback speed of a forth scene to which the level of importance is not assigned so that it is played back within a third playback time that is a total of playback time of the forth scene based on the third playback time;

wherein the playback speed of forth scene is higher than the playback speed of second scene.

3. The playback device according to claim 1, wherein the video data is data where at least a video and a tag are combined for each scene, the playback device further includes a tag data processor that acquires a tag assigned to the video data for each scene, and the playback controller sets a scene to which the tag is assigned as a scene with a higher level of importance at a lower playback speed, and sets a scene to which the tag is not assigned as a scene with a lower level of importance at a higher playback speed.

4. The playback device according to claim 1, wherein the video data is data where at least a video, a tag and a level of importance are combined for each scene to which a level of importance is assigned, the playback device further includes a tag data processor that acquires a tag and a level of importance assigned to the video data for each scene, and the playback controller sets a scene with a higher level of importance to which the tag is assigned at a lower playback speed, sets a scene with a lower level of importance to which the tag is assigned at a higher playback speed, and sets a scene to which the tag is not assigned at a still higher playback speed than the scene with a lower level of importance to which the tag is assigned.

5. A playback method comprising:

setting playback speeds for a plurality of scenes of video data based on a level of importance of each scene, a first set time that is set as an initial total playback time of a first scene assigned a higher level of importance, and a second set time that is set as an initial total playback time of a second scene assigned a lower level of importance, wherein the plurality of scenes comprises scenes to which a level of importance is assigned; and converting the video data into video data for a playback speed set by the playback controller for each scene, wherein the setting playback speeds of video data includes:

setting a playback speed of a third scene assigned as the most important scene of the plurality of scenes to 1×playback speed, wherein the third scene comprises a playback time that is the third scene played back at 1×playback speed, when the playback time of the third scene is longer than the first set time:

defining the second scene as a subset of scenes of the plurality of scenes to which information about the level of importance is assigned as lower than the third scene, and sets the playback speed of the second scene such that the second scene is played back within the second set time, and when the playback time of the third scene is equal to or shorter than the first set time:

setting a playback speed of a scene to 1×playback speed, the scene comprising all scenes of the plurality of scenes that can be played back within the first set time when played back at 1×playback speed in descending order of importance including and subsequent to the third scene, defining the second scene comprising the remaining scenes of the plurality of scenes to which a level of importance is assigned that cannot be played back within the first set time at 1×playback speed, and setting a playback speed of the second scene such that the second scene is played back within a time obtained by adding a time difference to the second set time, the time difference obtained by subtracting the total playback time of the scenes played at 1×speed from the first set time.

6. A non-transitory recording medium storing a playback program causing a computer to execute:

a reading step of reading video data and a level of importance of each scene of a plurality of scenes of the video data from a recording medium, the plurality of scenes comprises scenes to which a level of importance is assigned;

a setting step of setting playback speeds for the plurality of scenes based on a level of importance of each scene, a first set time that is set as an initial total playback time of a first scene assigned a higher level of importance, and a second set time that is set as an initial total playback time of a second scene assigned a lower level of importance;
a converting step of converting the video data into video data for a playback speed set by the playback controller for each scene,
wherein the setting playback speeds of video data includes:
   setting a playback speed of a third scene assigned as the most important scene at 1×playback speed, wherein the third scene comprises a playback time that is the third scene played back at 1×playback speed,
   when the playback time of the third scene is longer than the first set time:
      defining the second scene as a subset of scenes of the plurality of scenes to which information about the level of importance is assigned as lower than the third scene, and
      sets the playback speed of the second scene such that the second scene is played back within the second set time, and
   when the playback time of the third scene is equal to or shorter than the first set time:
      setting a playback speed of a scene to 1×playback speed, the scene comprising all scenes of the plurality of scenes that can be played back within the first set time when played back at 1×playback speed in descending order of importance including and subsequent to the third scene,
      defining the second scene comprising the remaining scenes of the plurality of scenes to which a level of importance is assigned that cannot be played back within the first set time at 1×playback speed, and
      setting a playback speed of the second scene such that the second scene is played back within a time obtained by adding a time difference to the second set time, the time difference obtained by subtracting the total playback time of the scenes played at 1×speed from the first set time.

\* \* \* \* \*